(12) United States Patent
Hatta et al.

(10) Patent No.: US 8,178,239 B2
(45) Date of Patent: *May 15, 2012

(54) CATHODE MATERIAL FOR SECONDARY BATTERY, METHOD FOR PRODUCING SAME, AND SECONDARY BATTERY

(75) Inventors: Naoki Hatta, Ichihara (JP); Toshikazu Inaba, Ichihara (JP); Izumi Uchiyama, Ichihara (JP)

(73) Assignees: Mitsui Engineering & Shipbuilding Co., Ltd., Tokyo (JP); Research Institute of Innovative Technology for the Earth, Kyoto (JP)

( * ) Notice: Subject to any disclaimer, the term of this patent is extended or adjusted under 35 U.S.C. 154(b) by 1383 days.

This patent is subject to a terminal disclaimer.

(21) Appl. No.: 10/543,864

(22) PCT Filed: Jan. 30, 2004

(86) PCT No.: PCT/JP2004/000919
§ 371 (c)(1),
(2), (4) Date: Feb. 5, 2008

(87) PCT Pub. No.: WO2004/068620
PCT Pub. Date: Aug. 12, 2004

(65) Prior Publication Data
US 2008/0138709 A1     Jun. 12, 2008

(30) Foreign Application Priority Data

Jan. 31, 2003  (JP) ................................. 2003-024454

(51) Int. Cl.
$H01M\ 4/36$    (2006.01)
(52) U.S. Cl. ................ 429/221; 429/231.5; 429/231.95; 252/182.1
(58) Field of Classification Search .................. 429/221, 429/231.5, 231.95; 252/182.1
See application file for complete search history.

(56) References Cited

FOREIGN PATENT DOCUMENTS

| | | |
|---|---|---|
| EP | 1049182 A | 11/2000 |
| EP | 1094532 A | 4/2001 |
| EP | 1193784 A | 4/2002 |
| EP | 1195838 A | 4/2002 |
| JP | 2002-117833 A | 4/2002 |

OTHER PUBLICATIONS

Zhang et al., "The preparation and characterization of olivine LiFePO4/C doped with Mo03 by a solution method", Solid State IOnics, North Holland Pub. Co., Amsterdam, NL. vol. 177, No. 37-38, Nov. 24, 2005, pp. 3309-3314.

*Primary Examiner* — Laura Weiner
(74) *Attorney, Agent, or Firm* — Law Offices of Peter H. Priest, PLLC

(57) ABSTRACT

A cathode material for a secondary battery containing a cathode active material represented by the general formula $Li_n FePO_4$ (wherein n represents a number from 0 to 1) as a primary component and molybdenum (Mo), wherein the cathode active material $Li_n FePO_4$ is composited with the Mo. In a preferred embodiment, the cathode material has conductive carbon deposited on the surface thereof.

10 Claims, 15 Drawing Sheets

CATHODE MATERIAL FOR SECONDARY BATTERY, METHOD FOR PRODUCING SAME, AND SECONDARY BATTERY

TECHNICAL FIELD

The present invention relates to a cathode material for a secondary battery, a method for producing the cathode material, and a secondary battery using the cathode material. More particularly, the present invention relates to a cathode material for a lithium secondary battery for use in electric vehicles and hybrid electric vehicles as well as portable devices such as cellular phones, a method for producing the cathode material, and a secondary battery using the cathode material.

BACKGROUND ART

Lithium iron phosphate $LiFePO_4$ used as a cathode material in a secondary battery such as a metal lithium battery, lithium ion battery or lithium polymer battery is subjected to electrode oxidation/reduction accompanied by doping/undoping of lithium during the process of charging and discharging. Lithium iron phosphate $LiFePO_4$ is expected as a highly potential cathode material in the next generation because it has a considerably large theoretical capacity (170 mAh/g) and can create a relatively high electromotive force (about 3.4 to 3.5 V at $Li/Li^+$ anode) and because it is considered to be produced at low cost since it can be produced from iron and phosphorus, which are abundant resources. An $LiFePO_4$ cathode system having an olivine-type crystal structure, unlike a number of other currently-available cathode systems such as a lithium cobaltate [$LiCoO_2$] cathode system, is in a two-phase equilibrium state in which only a reduced form (discharged state) $LiFe(II)PO_4$ as a first phase into which Li has been fully inserted and an oxidized form (charged state) $Fe(III)PO_4$ as a second phase from which Li has been completely extracted exist [that is, no intermediate phase, such as $Li_{0.5}(Fe^{2+}_{0.5}Fe^{3+}_{0.5})PO_4$, is not formed] all through the electrode oxidation/reduction process. As a result, the cathode system has an interesting property that the charge/discharge voltage is always kept constant and thus its charge/discharge state is easy to control. However, both the oxidized form (discharged state) $LiFe(II)PO_4$ and Li-extracted oxidized reduced form (charged state) $Fe(III)PO_4$ have extremely low conductivities, and $Li^+$ ions cannot move quickly in the cathode material (the two features are assumed to be associated with each other as described later). Thus, even when a secondary battery is fabricated using Li or the like in the anode, only a small effective capacity, bad rate characteristics and bad cycle characteristics can be obtained. As a method for enhancing the surface conductivity of a cathode material, there has been disclosed a process for depositing carbon on the surfaces of particles of a complex oxide (including an oxo acid salt such as sulfate, phosphate or silicate) represented by the chemical formula $A_aM_mZ_zO_oN_nF_f$ (wherein A represents an alkali metal atom, M represents Fe, Mn, V Ti, Mo, Nb, W or other transition metal atom, and Z represents S, Se, P, As, Si, Ge, B, Sn or other non-metal atom). When the composite material is used in the electrode system of a battery, the electric field around interfaces of the complex oxide particles, a current collector (conductivity-imparting) material and an electrolyte can be uniform and stable and the efficiency can be improved in the course of electrode oxidation/reduction (see Document 1). To deposit carbon on the surfaces of the complex oxide particles, an organic substance (polymer, monomer, or low-molecular weight compound) from which carbon is formed by pyrolysis or carbon monoxide is added to the complex oxide and pyrolyzed (a composite material of the complex oxide and surface covering carbon can be obtained by thermal reaction of the organic substance and the ingredients of the complex oxide under reducing conditions). According to Document 1, an improvement in the surface conductivity of the complex oxide particles can be realized by the method, and high electrode performance such as high discharge capacity can be achieved when Li polymer battery is produced using a composite material prepared by depositing carbon on the surfaces of particles of a cathode material such as $LiFePO_4$. There has been also disclosed a method for producing a cathode active material comprising the steps of mixing and milling ingredients of a compound represented by the general formula $LixFePO_4$ (wherein $0<x\leq1$), and calcining the mixture in an atmosphere with an oxygen content of 1012 ppm (by volume) or lower, wherein a non-crystalline carbon material such as acetylene black is added at any point in the processing (see Document 2).

The above techniques are applied to improve the cathode performance, both based on the low conductivity of a phosphate cathode material such as $LiFePO_4$ and the slow movement of Li ions in the cathode material. Basically, the techniques try to avoid these difficulties by depositing a conductive substance such as carbon on the surface of the cathode material or adding a conductive substance to the cathode material and reducing the particle size of the cathode material as much as possible to limit the ion diffusion distance.

Attempts have been made to improve the cathode performance by enhancing the conductivity of a $LiFePO_4$ cathode material by replacing some of Li or Fe of the cathode material with different metal elements, or compositing or doping some of Li or Fe of the cathode material with different metal elements (see Documents 3 and 4, for example). Document 3 discloses that when Al, Ca, Ni or Mg is introduced into the $LiFePO_4$ cathode material, its capacity can be improved. It is, for example, reported that a metal lithium battery using the $LiFePO_4$ cathode material free of the above elements exhibited a discharge capacity of 117 mAh/g in the first cycle and the rapid discharge capacity decreases with the progress of the cycle whereas a battery using a $LiMg_{0.05}Fe_{0.95}PO_4$ cathode material obtained by replacing some of Fe of the $LiFePO_4$ cathode material with Mg exhibited a discharge capacity of about 120 to 125 mAh/g and less deterioration with the progress of the cycle (although no objective evidence which indicates that Fe is replaced with Mg in the cathode material is shown).

Document 4 discloses that cathode materials into which the elements Mg, Al, Ti, Zr, Nb and W are doped, respectively, are produced by adding compounds containing $Mg^{2+}$, $Al^{3+}$, $Ti^{4+}$, $Zr^{4+}$, $Nb^{5+}$ and $W^{6+}$ (Mg is in the form of an oxalate, Nb is in the form of a metal phenoxide, and the others are in the form of metal alkoxides) respectively to the ingredients of a $LiFePO_4$ cathode material and calcining the mixtures. It is assumed in the document that the materials have some of their Li replaced with each of the elements and exist in the form of $Li_{1-x}M_xFePO_4$. It is also reported that the metal ion-doped cathode materials had conductivities in the order of $10^{-1}$ to $10^{-2}$ S/cm, which is about $10^8$ times greater than that of the non-doped cathode material, at room temperature, and metal lithium batteries using the metal ion doped cathode materials with such high conductivities had excellent rate characteristics and a long cycle life. According to Document 4, one of the metal lithium batteries exhibited a discharge capacity slightly greater than 140 mAh/g at a low charge/discharge rate of C/10 (although the discharge capacity is described as about 150 mAh/g in the document, it is close to 140 mAh/g as long as seen in an accompanying drawing), and was able to be stably charged and discharged cyclically at very high rates of 21.5 C and 40 C, exhibiting reduced discharge capacities of slightly lower than 70 mAh/g and about 30 mAh/g, respectively (C/n is the rate of charging or discharging a battery under constant current, wherein n is the number of hours in which the battery is completely charged or discharged. There is no description in the document about the dopant element from which the charge/discharge data were derived and its content in the cathode material.).

It is assumed in Document 4 that since a small amount (less than 1 mol %, in terms of element ratio, based on iron) of the polyvalent ions enter the sites of $Li^+$ ions in the crystal structure of the reduced form $LiFe(II)PO_4$ of the cathode material and its Li-extracted oxidized form $Fe(III)PO_4$, a small amount of $Fe^{3+}$ and $Fe^{2+}$ are generated in the reduced phase and the oxidized phase, respectively, to create an oxidized state in which $Fe^{2+}$ and $Fe^{3+}$ coexist, and, consequently, P-type semiconductivity and N-type semiconductivity appear in the reduced phase and the oxidized phase, respectively, and provides the improvement in the conductivity. It is also reported that when the $LiFePO_4$ cathode material was calcined together with any of the compounds containing the above bivalent to hexavalent ions, the conductivity of the cathode material was also improved (since the transition metal elements Ti, Zr, Nb and W can be in the form of stable positive ions with different valences, the valences of the positive ions in the obtained cathode materials may be different from those of the compounds added for doping).

Document 1: JP-A 2001-15111
Document 2: JP-A 2002-110163
Document 3: "Research for the Future Program, Tatsumisago Research Project: Preparation and Application of Newly Designed Solid Electrolytes (Japan Society for the Promotion of Science: Research Project No. JSPS-RFTF96PO010) [http://chem.sci.hyogo-u.ac.jp/ndse/index.html] (updated on Jun. 21, 2000)
Document 4: Nature Materials Vol. 1, pp. 123 to 128 (October, 2002)

The methods disclosed in Documents 3 and 4, however, cannot provide satisfactory results at the moment. The charge/discharge capacity achieved by the former method is 120 to 125 mAh/g at best. In addition, although the adaptability of the latter to high-rate charging/discharging is remarkable, only a charge/discharge capacity much smaller than the theoretical capacity of the cathode material 170 mAh/g can be obtained (slightly higher than 140 mAh/g) even at a low rate of C/10 in spite of the fact that the conductivity of the $LiFePO_4$ cathode material is improved. Further, the rise/fall of voltage in the final stage of charge or discharge under constant current in the battery capacity-voltage characteristic curve is not very steep in spite of the high-rate characteristics. According to the data shown in Document 4, the voltage has a gentle rise/fall from points about 80% of the depths of charge and discharge at a rate of C/10. In a battery having a small internal resistance and high-rate characteristics, however, the rise/fall of voltage should be as steep as 90 degrees. The facts suggest the possibility that the type of the composited or doped element and the compositing or doping method is not fully appropriate.

DISCLOSURE OF THE INVENTION

An object of the present invention is to provide a cathode material containing lithium iron phosphate as a cathode active material and having a large charge/discharge capacity, high-rate adaptability and good charge/discharge cycle characteristics, an easy method for producing the cathode material, and a secondary battery using the cathode material.

As a result of zealous studies to accomplish the object, the present inventors have found that a cathode material obtained by compositing a cathode active material $LiFePO_4$ with molybdenum (which may be hereinafter referred to as "Mo") has drastically improved charge/discharge characteristics. In addition, when conductive carbon is deposited on the surface of the Mo composite cathode material, an effective capacity close to the theoretical capacity 170 mAh/g of the cathode system and good charge/discharge cycle characteristics can be achieved.

A first aspect of the present invention is a cathode material for a secondary battery containing a cathode active material represented by the general formula $Li_nFePO_4$ (wherein n represents a number from 0 to 1, the same shall apply hereinafter) as a primary component and molybdenum (Mo). The cathode material containing $Li_nFePO_4$ as a primary component of a cathode active material and Mo has a large charge/discharge capacity, high-rate adaptability and good charge/discharge cycle characteristics which have not been previously achieved as shown in Examples described later.

A second aspect of the present invention is the cathode material for a secondary battery according to the first aspect, wherein the content of molybdenum (Mo) is in the range of 0.1 to 5 mol %, in terms of element ratio, based on iron in the cathode active material. When the content of Mo is in the above range, excellent charge/discharge performance can be achieved.

A third aspect of the present invention is a cathode material for a secondary battery having an olivine-type crystal structure, containing lithium ions ($Li^+$), iron (II) ions ($Fe^{2+}$) and phosphate ions ($PO_4^{3-}$) as primary components, and 0.1 to 5 mol % of molybdenum (Mo) based on the content of P.

The cathode material for a secondary battery has a large capacity and exhibits excellent cathode characteristics.

A fourth aspect of the present invention is the cathode material for a secondary battery according to the third aspect, wherein the content of lithium or iron, or the total content of lithium and iron, is smaller than that in the olivine-type lithium iron phosphate having a 1:1:1 stoichiometric ratio of lithium, iron and phosphorus by, at most, an amount in moles corresponding to the content of molybdenum (Mo).

When the amount of Li is relatively reduced, an excellent cathode material for a secondary battery with good cycle characteristics can be obtained. When the amount of Fe is relatively reduced, an excellent cathode material which can reduce the internal resistance of a battery can be obtained.

A fifth aspect of the present invention is the cathode material for a secondary battery according to the third or fourth aspect, substantially free of $Fe(II)_2Mo(IV)_3O_8$. The cathode material for a secondary battery has the same effect as the cathode material of the fourth aspect.

A sixth aspect of the present invention is the cathode material for a secondary battery according to any one of the first to fifth aspects, further comprising conductive carbon deposited on the surface thereof. When conductive carbon is deposited on the surface of the Mo-containing cathode material, the conductivity of the cathode material is further enhanced, and an effective capacity close to the theoretical capacity of an $Li_nFePO_4$ cathode system and good charge/discharge cycle characteristics can be achieved as shown in Examples described later.

A seventh aspect of the present invention is a method for producing a cathode material for a secondary battery comprising the steps of mixing ingredients of a cathode active material $Li_nFePO_4$ and a compound containing molybdenum (Mo) to obtain a calcination precursor and calcining the calcination precursor to composite the cathode active material with Mo. The cathode material of the first aspect can be easily obtained by compositing the cathode active material with Mo.

An eighth aspect of the present invention is the method for producing a cathode material for a secondary battery according to the seventh aspect, wherein the compound containing molybdenum (Mo) is added such that the content of molybdenum (Mo) in the compound containing molybdenum (Mo) is 0.1 to 5 mol % based on the content of P in an ingredient for introducing phosphate ions ($PO_4^{3-}$). According to the eighth aspect, the cathode material of the third aspect can be easily obtained.

A ninth aspect of the present invention is the method for producing a cathode material for a secondary battery according to the seventh or eighth aspect, wherein the ingredients of the cathode active material $Li_nFePO4$ (wherein n represents a number from 0 to 1) are introduced such that the amount of lithium in an ingredient for introducing lithium, the amount of iron in an ingredient for introducing iron or the total amount thereof can be smaller than that in the olivine-type lithium iron phosphate having a 1:1:1 stoichiometric ratio of lithium, iron and phosphorus by, at most, an amount in moles corresponding to the content of molybdenum (Mo). According to the ninth aspect, the cathode material of the fourth aspect can be easily obtained.

A tenth aspect of the present invention is the method for producing a cathode material for a secondary battery according to any one of the seventh to ninth aspects, wherein the calcination step has a first stage in a temperature range of room temperature to 300-450° C. and a second stage in a temperature range of room temperature to the calcination completion temperature, and wherein the second stage of the calcination step is carried out after addition of a substance from which conductive carbon is formed by pyrolysis to the product of the first stage of the calcination step. According to this feature, by adding a substance from which conductive carbon is formed by pyrolysis after the first stage of the calcination step, a cathode material on which conductive carbon is uniformly deposited can be obtained. When the effect of the deposition of carbon is combined with the effect of compositing Mo, a cathode material which exhibits excellent charge/discharge behaviors can be easily obtained.

An eleventh aspect of the present invention is the method for producing a cathode material for a secondary battery according to the tenth aspect, wherein the substance from which conductive carbon is formed by pyrolysis is a bitumen or a saccharide. Bitumens and saccharides are turned into conductive carbon by pyrolysis and impart conductivity to the cathode material. In particular, a bitumen such as refined coal pitch, which is very inexpensive, is melted and spread evenly over the surfaces of the ingredient particles during calcination, and is pyrolyzed and turned into carbon deposits with high conductivity by calcination at a relatively low temperature. When a saccharide is used, a multiplicity of hydroxyl groups contained in the saccharide act on the surfaces of the particles of the ingredients and generated cathode material strongly and prevent the growth of crystals of the cathode material. Thus, the use of a saccharide can provide excellent crystal-growth inhibiting effect and conductivity-imparting effect.

A twelfth aspect of the present invention is a secondary battery containing the cathode material according to any one of the first to sixth aspects as a constituent element. According to this feature, the effect same as that of any one of first to sixth aspects can be obtained in a secondary battery.

BEST MODE FOR CARRYING OUT THE INVENTION

Figure 1:
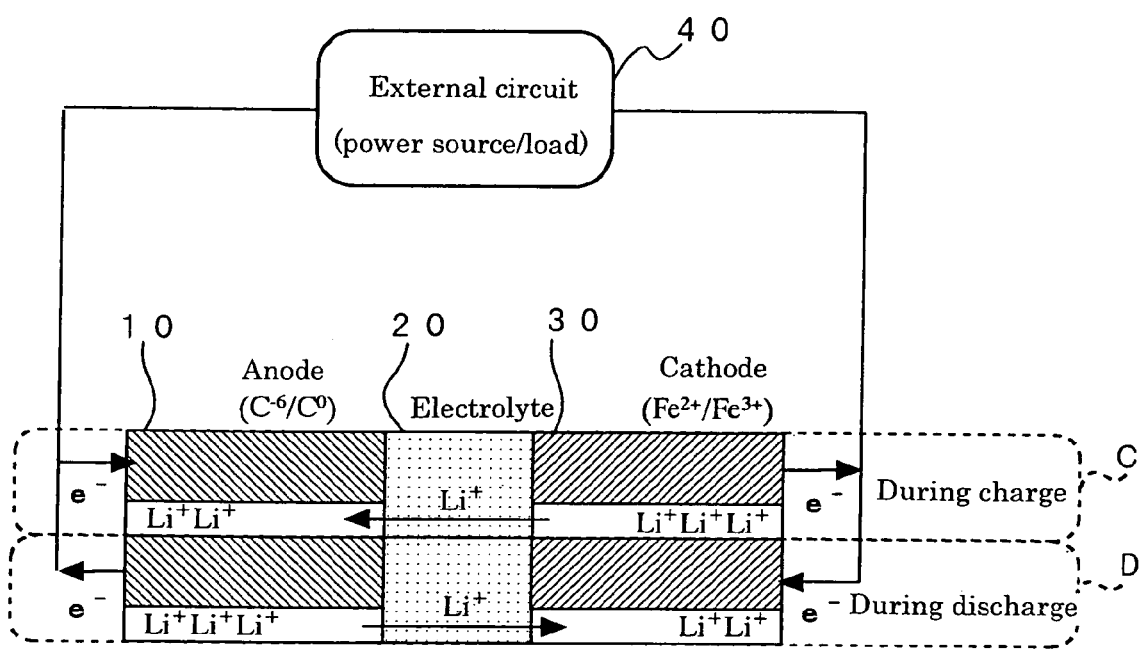
FIG. 1 is a schematic view for explaining the charge and discharge behaviors of a secondary battery.

Description will be hereinafter made of an embodiment of the present invention in detail in the following order: (A) Cathode material for secondary battery, (b) Ingredients, (C) Method for producing cathode material for secondary battery and (D) Secondary battery.

(A) Cathode Material for Secondary Battery

A cathode material for a secondary battery of the present invention contains a cathode active material represented by the general formula $Li_nFePO_4$ as a primary component and Mo, wherein the cathode active material $Li_nFePO_4$ is composited with the Mo (the material may be hereinafter referred to as "composite cathode material"). It has not been revealed in what state the Mo is in the composite cathode material. It is considered that the Mo has been substituted for some of Li or Fe and exists in the form of crystalline solid solution like $(Li_{1-y}Mo_y)FePO_4$ or $Li(Li_{1-y}Mo_y)PO_4$ (wherein y and z are numbers which satisfy the stoichiometric conditions) in the single-phase olivine-type LiFePO$_4$, or exists as another compound conjugate which can supply electrons or positive holes. It is also assumed that an olivine-type single crystal phase is not formed but byproduct impurities such as Fe(II)$_2$ Mo(IV)$_3$O$_8$ (Kamiokite) coexist depending on the mixing ratio of the ingredients at the time of adding Mo.

In the present invention, the terms "composite" and "compositing" are used in a wide sense including the solid solution form and conjugate form.

Since Li$_n$FePO$_4$ as a primary active material of the composite cathode material of the present invention has a crystal structure [with point group Pnma (olivine type) or Pbnm, both of which can be used as a cathode active material but the former is more general] which does not undergo any substantial change when subjected to electrochemical oxidation-reduction, the substance can be used as a cathode material for an alkali metal secondary battery which can be charged and discharged repeatedly. As a cathode material, the substance, in its own state, is in a state corresponding to a discharged state, and, when oxidation of central metal element Fe accompanied by undoping of the alkali metal Li occurs by electrochemical oxidation at its interface with an electrolyte, the cathode material is brought to a charged state. When the cathode material in the charged state is subjected to electrochemical reduction, reduction of central metal element Fe accompanied by redoping of the alkali metal Li occurs and the cathode material returns to the initial state, that is, to the discharged state.

The content of Mo in the composite cathode material is preferably 0.1 to 5 mol %, more preferably 0.5 to 5 mol %, in terms of element ratio, based on iron (or phosphorus) in the cathode active material. In some cases, the ingredients of the cathode active material are preferably introduced such that the amount in moles of Li or Fe or the total amount in moles of Li and Fe in the resulting cathode active material can be smaller by, at most, an amount in moles of molybdenum (Mo) to be added later, in order to control the charge/discharge characteristics of the resulting cathode, as shown in Example 6 described later.

In a preferred embodiment of the present invention, the cathode material has conductive carbon deposited on the surface thereof. The deposition of conductive carbon on the surface of the cathode material is made by adding a substance from which conductive carbon is formed by pyrolysis (which will be hereinafter referred to as "conductive carbon precursor") during a calcination process as described later.

(B) Ingredients

<Ingredients of Cathode Active Material Li$_n$FePO$_4$>

Description will be made of an Li$_n$FePO$_4$ cathode active material with a general olivine-type structure. Suitable examples of a substance for introducing lithium among the ingredients of Li$_n$FePO$_4$ with an olivine-type structure include hydroxides such as LiOH, carbonates and hydrogencarbonates such as Li$_2$CO$_3$, halides including chloride such as LiCl, nitrates such as LiNO$_3$, and other Li-containing degradable volatile compounds from which only Li remains in the resulting cathode material such as organic acid salts of Li. Phosphates and hydrogenphosphates such as Li$_3$PO$_4$, Li$^2$HPO$_4$, and LiH$_2$PO$_4$ can be also used.

Suitable examples of a substance for introducing iron include hydroxides, carbonates and hydrogencarbonates, halides such as chloride, nitrates of iron, and other iron containing degradable volatile compounds from which only Fe remains in the resulting cathode material (e.g., organic acid salts, such as oxalates and acetates, of iron, and organic complexes, such as acetylacetonato complexes and metallocene complexes, of iron). Phosphates and hydrogenphosphates of iron can be also used.

Suitable examples of a substance for introducing phosphoric acid include phosphoric anhydride P$_2$O$_5$, phosphoric acid H$_3$PO$_4$, and degradable volatile phosphates and hydrogenphosphates from which only phosphate ions remain in the resulting cathode material [e.g., ammonium salts such as (NH$_4$)$_2$HPO$_4$, NH$_4$H$_2$PO$_4$, and (NH$_4$)$_3$PO$_4$].

When the ingredients contain undesirable elements or substances remaining in the resulting cathode material, the elements or substances should be decomposed or vaporized during calcination. It is needless to say that non-volatile oxo acid salts other than phosphate ions should not be used. Hydrates of the above compounds [e.g., LiOH.H$_2$O, Fe$_3$(PO$_4$)$_2$.8H$_2$O] can be also used although not shown here.

<In the Case Where Metal Iron is Used as the Ingredient for Introducing Iron>

As the ingredient for introducing iron, metal iron as a primary material which is inexpensive and easily available, instead of a compounds as above, can be used. The metal iron used is in the form of particles with a diameter of 200 μm or smaller, preferably 100 μm or smaller. In this case, metal iron, a compound which releases phosphate ions in a solution, a lithium source compound, and water can be used as the ingredients of the cathode material.

Examples of the "compound which releases phosphate ions in a solution" usable with metal iron include phosphoric acid H$_3$PO$_4$, phosphorous pentoxide PO$_5$, ammonium dihydrogenphosphate NH$_4$H$_2$PO$_4$, and diammonium hydrogenphosphate (NH$_4$)$_2$HPO$_4$. Among these, phosphoric acid, phosphorous pentoxide, ammonium dihydrogenphosphate are preferred since the iron can be kept under relatively strong acidic conditions during the process of dissolving. Although commercially available reagents may be used for these compounds, when phosphoric acid is used, it is preferred to measure its purity precisely by titration and calculate a factor in advance for stoichiometric precision.

As the "lithium source compound" usable in combination with metal iron, it is preferred to select a compound from which only lithium remains in the resulting cathode material after calcination (a Li-containing degradable volatile compound). Suitable examples of the compound include hydroxides such as lithium hydroxide LiOH, carbonates such as lithium carbonate Li$_2$CO$_3$, organic acid salts of Li, and hydrates thereof (LiOH.H$_2$O, etc.).

<Mo-Containing Compound>

A wide variety of compounds can be used as the Mo-containing compound to be added to the ingredients of the cathode material. Examples of the Mo-containing compound include halides and oxyhalide, such as chlorides, bromides, iodides and fluorides, of Mo (e.g., molybdenum pentachloride MoCl$_5$), organic acid salts, such as oxyoxalates, acetates and naphthenate, of Mo, hydroxide and oxyhydroxide of Mo, alkoxides and phenoxides of Mo, and complexes, such as acetylacetonato complexes, aromatic complexes and carbonyl complexes, of Mo. The examples will be discussed in more detail (hydrates of the compounds can be also used although not shown here): Examples of the halides and oxyhalide include MoCl$_3$, MoBr$_3$, MoI$_2$, MoF$_6$, MoOCl$_4$ and MoO$_2$Cl$_2$ in addition to MoCl$_5$. Examples of the oxyoxalates include MoOC$_2$O$_4$ and MoO$_2$(C$_2$O$_4$)$_2$. Examples of the acetates include [Mo(CH$_3$COO)$_2$]$_2$. Examples of the hydroxide and oxyhydroxide include Mo(OH)$_3$ and MoO(OH)$_3$. Examples of the alkoxides includes Mo(C$_2$H$_5$)$_5$ and Mo(i-C$_3$H$_7$)$_5$. Examples of the acetylacetonato complexes include MoO$_2$(C$_6$H$_7$O$_2$). Examples of the aromatic complexes include $MO(C_6H_6)_2$ and $Mo(C_5H_5)_2X_3$ (wherein X represents a halogen atom). Examples of the carbonyl complexes include $Mo(CO)_6$. Among these, the use of halides, such as chlorides, is preferred from the viewpoint of improvement of the cathode performance. These compounds may be added singly or in combination with a solvent or a dispersion medium such as alcohol, ketone, acetonitrile, cyclic ether or water to the ingredients of the cathode material. The resulting mixture is stirred and ground to obtain a calcination precursor.

The amount of the Mo-containing compound added is such that the content of Mo can be about 0.1 to 5 mol %, preferably about 0.5 to 5 mol %, based on the central metal element Fe (or P) in the ingredients of the cathode material. In some cases, the ingredients of the cathode active material are preferably introduced such that the amount in moles of Li or Fe or the total amount in moles of Li and Fe in the resulting cathode article material can be smaller by, at most, an amount in moles of the molybdenum (Mo) added, in order to control the charge/discharge characteristics of the resulting cathode, as described before. Since the halides and oxyhalides have high reactivity, when they are added to the ingredients of the cathode material in conjunction with water or an alcohol, they are transformed into molybdenum hydroxide and molybdenum alkoxide, respectively, before being composed with other ingredients. In some cases, when a reducing agent such as carbon or hydrogen, an oxidizing agent such as oxygen, and/or a third component such as chlorine or phosgene are added prior to the calcination to the calcination precursor of the cathode material to which an Mo-containing compound has been added depending on the type of the Mo-containing compound, the Mo composite cathode material can be prepared in better conditions. Metal Mo or an oxide of Mo can be used as the ingredient of the Mo composite material when the preparation of the calcination precursor or preliminary calcination is carried out under conditions under which a compound which can composite the cathode material with Mo when mixed with another substance is generated.

<Conductive Carbon Precursor>

Examples of the conductive carbon precursor include bitumens (what is called asphalt; including pitches obtained from coals or petroleum sludge), saccharides, stylene-divinylbenzen copolymers, ABS resins, phenol resins, and crosslinked polymers containing aromatic groups. Among these, bitumens (especially, what is called refined coal pitch) and saccharides are preferred. Bitumens and saccharides are turned into conductive carbon by pyrolysis and impart conductivity to the cathode material. In particular, refined coal pitch is very inexpensive. Also, refined coal pitch is fused and spread evenly over the surfaces of the ingredient particles during calcination, and is subjected to pyrolysis and turns into carbon deposits with high conductivity by calcination at a relatively low temperature (650 to 800° C.). Also, since the conductive carbon deposits have an effect of inhibiting fusion of cathode material particles by sintering, the particle size of the resulting cathode material particles can be advantageously small. When a saccharide is used, a multiplicity of hydroxyl groups contained in the saccharide act on the surfaces of the particles of the ingredients and generated cathode material strongly and prevent the growth of crystals of the cathode material. Thus, the use of a saccharide can provide excellent crystal-growth inhibiting effect and conductivity-imparting effect.

In particular, coal pitch having a softening point in a range of 80 to 350° C. and a pyrolytic weight-loss initiation temperature in a range of 350 to 450° C. and capable of forming conductive carbon by pyrolysis and calcination at a temperature not lower than 500° C. and not higher than 800° C. is suitably used. In order to further improve the performance of the cathode, the use of refined coal pitch having a softening point in a range of 200 to 300° C. is more preferred. It is needless to say that impurities contained in the refined coal pitch should not adversely affect the cathode performance, and the use of refined coal pitch having an ash content of not higher than 5000 ppm is particularly preferred.

Especially preferred as the saccharide is one which is decomposed in a temperature range of not lower than 250° C. and lower than 500° C. and gets partially melted at least once in the course of heating from 150° C. up to the above-described temperature range and from which conductive carbon is formed by pyrolysis and calcination at a temperature not lower than 500° C. and not higher than 800° C. This is because a saccharide having above specific properties is melted and adequately coats the surfaces of the cathode material particles during reaction under heating and is turned into conductive carbon deposits properly on the surfaces of the generated cathode material particles by pyrolysis, and because it can prevent the growth of crystals during this process as described before. Further, the saccharide preferably form by calcination at least 15% by weight, preferably at least 20% by weight, of conductive carbon based on the dry weight of the saccharide before the calcination. This is to make it easy to control the amount of resulting conductive carbon. Examples of the saccharide having above properties include oligosaccharides such as dextrin, and high-molecular saccharides such as soluble starches and slightly crosslinked starches prone to melting when heated (for example, starches containing 50% or more of amylose).

(C) Method for Producing Cathode Material for Secondary Battery

<Outline of the Production Method>

The cathode material for a secondary battery of the present invention is obtained by calcining a calcination precursor prepared by mixing the ingredients of the cathode active material $Li_nFePO_4$ and the Mo-containing compound for a prescribed period of time in a prescribed atmosphere at a prescribed temperature.

A carbon deposited composite cathode material obtained by depositing conductive carbon on the Mo composite cathode material exhibits better charge/discharge characteristics than the cathode material without carbon deposits. The carbon deposited composite cathode material can be produced by the steps of: preparing a calcination precursor, in the same manner as described before, by adding the Mo-containing compound to the ingredients of the cathode active material and stirring and grinding the mixture, carrying out a first stage of calcination (preliminary calcination) of the calcination precursor at 300 to 450° C. for several hours (five hours, for example), adding a prescribed amount of a conductive carbon precursor (a bitumen such as coal pitch or a saccharide such as dextrin) to the product of the preliminary calcination and grinding and stirring the mixture, and carrying out a second stage of calcination (final calcination) in a prescribed atmosphere for a period of time ranging from a few hours to one day.

A carbon deposited composite cathode material with relatively good charge/discharge characteristics can be obtained by calcining a calcination precursor prepared by adding the conductive carbon precursor to the ingredients of the cathode active material together with the Mo-containing compound (not adding it to the product of the preliminary calcination) and grinding and stirring the mixture (in this case, it is preferred to carry out two-stage calcination process and grinding of the product of the preliminary calcination).

Of the above two methods, which are different in the timing of adding the conductive carbon precursor, the former (in which the conductive carbon precursor is added after the preliminary calcination) is preferred since a carbon deposited composite cathode material with better charge/discharge characteristics can be obtained. Thus, description will be hereinafter made mainly about the former method. However, in the latter method (in which the conductive carbon precursor is added before the preliminary calcination), the preparation of the calcination precursor and the selection of calcination conditions can also be made in the same manner as in the former method.

<Preparation of Calcination Precursor>

The calcination precursor can be prepared by adding the Mo-containing compound to the dry ingredients of the cathode active material and grinding and stirring the mixture in a planetary ball mill or the like for a period of time ranging from one hour to one day. An organic solvent such as alcohol, ketone or tetrahydrofuran or water may be added to the mixture to perform the grinding and stirring of the mixture in wet conditions. At this time, when water or an alcohol is added to a compound with high reactivity with water or alcohols such as molybdenum chloride to perform the grinding and stirring of the mixture in wet conditions, a reaction which generates molybdenum hydroxide or molybdenum alkoxide occurs during the process.

When metal iron is used as an ingredient of the cathode active material, the calcination precursor is prepared by mixing a compound which releases phosphate ions in a solution, water and metal iron, adding an Li-containing degradable volatile compound such as lithium carbonate, lithium hydroxide or a hydrate thereof to the mixture, adding the Mo-containing compound to the reaction product, and grinding and stirring the resulting mixture in wet conditions in the same manner as described above. In mixing the ingredients, the compound which releases phosphate ions in a solution such as phosphoric acid, metal iron and water are first mixed and ground to dissolve and react mutually. The grinding is conducted to apply a shear force to the metal iron in the solution to renew the surfaces thereof. The yield of the cathode material can be thereby improved. The grinding is preferably conducted in an automatic grinding machine, ball mill, beads mill or the like for about 30 minutes to 10 hours, depending on the efficiency of the grinding device. Irradiation of ultrasonic wave is also effective to complete the dissolution reaction of the metal iron. In grinding the iron, a volatile acid such as oxalic acid or hydrochloric acid may be added to increase the acid concentration, or a volatile oxidizing agent such as oxygen (air), hydrogen peroxide, halogen (bromine, chlorine, etc.), or an oxyhalide such as hypochlorous acid or bleaching powder may be added. Addition of nitric acid, which is a volatile acid which is oxidative and acidic, is also effective. The reaction is carried out effectively when the reactants are heated to about 50 to 80° C. The above volatile acid and oxidizing agent are preferably used in an amount equal to or less than required for the oxidation of iron from its metallic form to iron (II) ions. As a result, the dissolution of the metal iron into the solution of phosphoric acid or the like can be thereby accelerated, and the volatile acid and oxidizing agent and so on are removed by the calcination process and does not remain in the cathode material. Next, lithium hydroxide or the like as a lithium source is added to the solution after grinding. After the addition of the lithium source, pulverizing or grinding is preferably conducted as needed. When grinding and stirring is conducted after the addition of the Mo-containing compound, a calcination precursor is prepared.

<Outline of Calcination>

The calcination precursor obtained by mixing the ingredients of the cathode material and the Mo-containing compound as described above is subjected to calcination. The calcination is carried out under calcination conditions of suitable temperature range, from 300 to 900° C. as generally employed, and suitable treatment time. The calcination is preferably carried out under oxygen-free conditions in order to prevent generation of oxidant impurities and promote reduction of remaining oxidant impurities.

In the production method of the present invention, although the calcination can be carried out in a single stage including the heating and its subsequent temperature maintenance, the calcination process is preferably divided into two stages, that is, a first calcination stage in a lower temperature range (generally, in a temperature range of room temperature to 300-450° C.; which may be hereinafter referred to as "preliminary calcination") and a second calcination stage in a higher temperature range (generally, in a range of room temperature to the calcination completion temperature (about 500 to 800° C.); which may be hereinafter referred to as "final calcination").

In the preliminary calcination, the ingredients of the cathode material are heated and reacted into an intermediate phase before transforming into the final cathode material. At this time, pyrolytic gas is generated in many cases. As the temperature at which the preliminary calcination should be finished, a temperature at which the gas generation has been almost completed but the reaction into the cathode material as the final product has not fully proceeded (in other words, a temperature at which there is still a room for the constituent elements in the cathode material to undergo rediffusion and homogenization in the final calcination in a higher temperature range as the second stage) is selected.

In the final calcination following the preliminary calcination, the temperature is raised to and maintained in a range in which the rediffusion and homogenization of the constituent elements occurs, the reaction into the cathode material is completed, and, moreover, crystal growth by sintering or the like can be prevented as much as possible.

When the carbon deposited composite cathode material as described before is produced, the performance of the resulting cathode material can be further improved when the second stage of the calcination is carried out after a conductive carbon precursor has been added to the product of the first stage of the calcination. When a conductive carbon precursor, especially a coal pitch or a saccharide which is melted by heating, is used, it is preferred to conduct the final calcination after adding it to the ingredients after the preliminary calcination (in an intermediate phase where the generation of gas from the ingredients has been almost completed) although it may be added to the ingredients before the preliminary calcination (even in this case, the cathode performance can be fairly improved). This means providing the step of adding the conductive carbon precursor to the ingredients between the preliminary calcination and the final calcination in the calcination process. This makes it possible to prevent the conductive carbon precursor such as a coal pitch or saccharide which undergoes melting and pyrolysis by heating from being foamed by the gas given off from the ingredients, so that molten conductive carbon precursor can be spread more evenly on the surfaces of the cathode material, allowing pyrolytic carbon to be deposited more uniformly.

This is attributed to the following reason.

Since most of the gas produced from the decomposition of the ingredients is released during the preliminary calcination and substantially no gas is generated during the final calcination, the addition of the conductive carbon precursor after the preliminary calcination allows uniform deposition of conductive carbon. As a result, the resulting cathode material is provided with higher surface conductivity, and the particles of the cathode material are firmly and stably bonded together. A carbon deposited composite cathode material with relatively good charge/discharge characteristics can be obtained when the conductive carbon precursor is added to the ingredients before the preliminary calcination as described before. However, the performance of the cathode material produced by this method is not as good as that of the cathode material produced by adding a conductive carbon precursor after the preliminary calcination. This is considered to be because gas vigorously given off from the ingredients during the preliminary calcination foams the conductive carbon precursor in a molten and incompletely pyrolyzed state to inhibit uniform deposition of carbon and adversely affects the compositing of Mo.

The calcination may be carried out while a predetermined amount of hydrogen or water (water, water vapor or the like) is continuously fed, together with an inert gas, into a furnace. Then, a carbon deposited composite cathode material with better charge/discharge characteristics than those of a carbon deposited composite cathode material produced without feeding hydrogen or water can be obtained. In this case, hydrogen or water may be added throughout the entire period of the calcination process, or particularly while the temperature is in a range of not higher than 500° C. to the calcination completion temperature, preferably in a range of not higher than 400° C. to the calcination completion temperature, more preferably in a range of not higher than 300° C. to the calcination completion temperature. To "add" gaseous hydrogen or water vapor includes conducting calcination in the presence of hydrogen gas (in an atmosphere of hydrogen or the like).

<Calcination Conditions (in the Case where Deposition of Conductive Carbon is Not Involved)>

The conditions under which the calcination precursor is calcined (especially, calcination temperature and calcination period) should be set carefully.

The higher the calcination temperature, the better to complete and stabilize the reaction of the ingredients of the composite cathode material. However, when deposition of conductive carbon is not involved, too high a calcination temperature may cause too much sintering and growth of crystals, which leads to a significant deterioration of the charge/discharge rate characteristics (see Experimental Example 1 described later). Thus, the calcination temperature is in the range of about 600 to 700° C., preferably in the range of about 650 to 700° C., and the calcination is carried out in an inert gas such as $N_2$ or Ar. When hydrogen (including water from which hydrogen is produced by thermolysis) is added at this time as described before, the performance of the resulting cathode material can be improved.

The calcination period is from a few hours to three days. When the calcination temperature is about 650 to 700° C., if the calcination period is about 10 hours or less, the uniformity of the Mo solid solution in the resulting cathode material may be insufficient. If so, abnormal charging/discharging occurs and the performance is rapidly deteriorated after a dozen cycles of charging and discharging. Thus, the calcination period is preferably one to two days (24 to 48 hours). The abnormal charging/discharging is an abnormal behavior in which the internal resistance of the battery increases with the progress of the cycles and the relation between the charge/discharge capacity and the voltage exhibits a discontinuous two-stage curve, and the cause of it has not yet been discovered. At present, it is considered to be because cohesion or phase separation/segregation of localized chemical species of the composited element Mo is induced by the movement of $Li^+$ ions during charge and discharge and the movement of $Li^+$ ions is inhibited.

When the calcination temperature is 700° C. or higher, although such behavior is not observed, sintering and growth of the cathode material crystal are accelerated and good battery performance cannot be achieved. Thus, an appropriate period shorter than 10 hours should be selected as the calcination period. A battery with a metal Li anode using an Mo composite $LiFePO_4$ cathode material produced under good conditions exhibits a large charge/discharge capacity at room temperature (about 150 mAh/g at a charge/discharge current density of 0.5 mA/cm² for a coin-type secondary battery and about 135 mAh/g at 0.5 C rate (about 120 mAh/g at 2 C rate) for a secondary battery with a thin-film cathode) and good charge/discharge cycle characteristics as shown in Examples described later.

In order to achieve good uniformity of the cathode material, it is preferred to fully pulverize and stir the product of the preliminary calcination between the first and second stages of calcination (preliminary calcination and final calcination) and carry out the second stage of calcination (final calcination) at a prescribed temperature described before.

<Calcination Conditions (in the Case where Deposition of Conductive Carbon is Involved)>

The final calcination temperature is also very important when deposition of conductive carbon is involved. The final calcination temperature is preferably higher than that in the case where deposition of conductive carbon is not involved (750 to 800° C., for example). When the calcination temperature is high, the uniformity of distribution of Mo is less likely to be insufficient. Thus, a calcination period of 10 hours or less is selected. When a carbon deposited composite cathode material is produced by depositing conductive pyrolytic carbon derived from a bitumen such as coal pitch or a saccharide such as dextrin on the Mo composite $LiFePO_4$ cathode material, if the final calcination temperature is not higher than 750° C., the resulting cathode material exhibits the same abnormal behavior as the Mo composite cathode material without carbon deposits does during charge/discharge cycles. That is, the internal resistance of the battery increases with the progress of the cycles, and the relation between the charge/discharge capacity and the voltage exhibits a discontinuous two-stage curve and the performance is deteriorated (see Experimental Example 2 described later). In the case of a carbon deposited Mo composite cathode material, such abnormal charging/discharging is often observed in earlier stage, that is, within several cycles of charging/discharging.

However, a carbon deposited composite cathode material subjected to final calcination at a temperature higher than about 750° C., such as 775° C., in an inert gas does not exhibit the abnormal behavior. This is assumed to be because the distribution of Mo is uniformed and stabilized by employing a relatively high final calcination temperature. As shown in Examples described later, it has been found that a battery with a metal Li anode using the thus obtained $Mo/carbon/LiFePO_4$ composite cathode material exhibits a charge/discharge capacity close to the theoretical capacity (170 mAh/g) (about 160 mAh/g or higher at a charge/discharge current density of 0.5 mA/cm² for a coin-type secondary battery and about 155 mAh/g at 0.5 C rate (about 140 mAh/g at 2 C rate) for a secondary battery with a thin-film cathode) at room temperature, and has a long cycle life and good rate characteristics. In the case of a carbon deposited composite cathode material, unlike a deposited carbon-free cathode material, no deterioration of performance such as a decrease in the capacity occurs even when calcination is carried out at a high temperature of 775° C. This is considered to be because the conductivity of the cathode material is improved by the compositing of Mo and deposition of the conductive carbon and because Li ions can be moved easily in the cathode material particles since the deposited carbon inhibits the sintering and growth of crystals to prevent increase in the size of cathode material particles. Thus, the carbon deposited composite cathode material produced under the above conditions has very high performance and very high stability.

The amount of conductive carbon deposits is preferably in the range of about 0.5 to 5% by weight based on the total amount of the Mo composite cathode material and the conductive carbon, depending on the size of crystalline particles of the Mo composite cathode material. Preferably, the amount of conductive carbon deposits is about 1 to 2% by weight when the crystalline particle size is about 50 to 100 nm and 2.5 to 5% by weight when the crystalline particle size is about 150 to 300 nm. When the amount of carbon deposits is smaller than the above range, the conductivity imparting effect is low. When the amount of carbon deposits is too large, the deposited carbon inhibits the movement of $Li^+$ ions on the surfaces of the crystalline particles of the cathode material. In both cases, the charge/discharge performance tends to be lowered. To deposit a suitable amount of carbon, it is preferred to determine the amount of bitumen such as coal pitch and/or saccharide such as dextrin as a carbon precursor to be added based on the weight loss rate of the carbon precursor at pyrolytic carbonization obtained in advance.

(D) Secondary Battery

Examples of the secondary battery using the cathode material of the present invention obtained as described above include metal lithium battery, lithium ion battery and lithium polymer battery.

Taking a lithium ion battery as an example, description will be hereinafter made of a fundamental construction of a secondary battery. A lithium ion battery is a secondary battery characterized in that $Li^+$ ions move back and forth between an anode active material and a cathode active material in charging and discharging (see FIG. 1), as commonly called "rocking chair type" or "badminton shuttlecock type." In FIG. 1, designated as 10 is an anode, as 20 is an electrolyte, as 30 is a cathode, as 40 is an external circuit (power source/load), as C is the state during charge, and as D is the state during discharge.

During charge, $Li^+$ ions are inserted into the anode (carbon such as graphite is used in currently-available batteries) to form an intercalation compound (at this time, the anode carbon is reduced while the $Li^+$-extracted cathode is oxidized). During discharge, $Li^+$ ions are inserted into the cathode to form an iron compound-lithium complex (at this time, the iron in the cathode is reduced while the $Li^+$-extracted anode is oxidized to return to graphite or the like). During charge and discharge, $Li^+$ ions move back and force through the electrolyte to transport electrical charges. As the electrolyte, a liquid electrolyte prepared by dissolving an electrolyte salt such as $LiPF_6$, $LiCF_3SO_3$, or $LiClO_4$ in a mixed solution of a cyclic organic solvent such as ethylene carbonate, propylene carbonate, or γ-butyrolactone and a chain organic solvent such as dimethyl carbonate, or ethyl methyl carbonate; a gel electrolyte prepared by impregnating an electrolyte as above into a polymer gel substance; or a solid polymer electrolyte prepared by impregnating a liquid electrolyte as above into a partially crosslinked polyethylene oxide is used. When a liquid electrolyte is used, the cathode and the anode have to be insulated from each other by interposing therebetween a porous separating membrane (separator) made of a polyolefin or the like to prevent them from short-circuiting. The cathode and anode are respectively produced by adding a predetermined amount of a conductivity-imparting material such as carbon black and a binder, for example, a synthetic resin such as polytetrafluoroethylene, polyvinylidene fluoride or fluororesin or a synthetic rubber such as ethylene propylene rubber to the cathode or anode material, kneading the mixture with or without a polar organic solvent and forming the kneaded mixture into a thin film. Then, current collection is conducted using a metal foil or metal screen to construct a battery. When metal lithium is used for the anode, transitions between Li(O) and $Li^+$ take place at the anode in charging and discharging and a battery is thereby formed.

As the configuration of the secondary battery, a coin-type lithium secondary battery formed by incorporating a pellet-type cathode in a coin-type battery case and sealing the case and a lithium secondary battery in which a film coated sheet cathode is incorporated can be employed as shown in Examples in described later.

The present inventors added compounds containing $Mo^{5+}$, $Mg^{2+}$, $Al^{3+}$, $Zr^{4+}$, $Ti^{4+}i$, $V^{5+}$, $Sn^{2+}$, $Cr^{3+}$, $Cu^{2+}$ and so on to the ingredients of lithium iron phosphate and calcined the mixtures to obtain cathode materials with which the elements are composited, and examined the charge/discharge behaviors of the materials. As a result, it was found that Mo is the most effective to improve the charge/discharge performance. Although these elements cannot be treated the same way since various types of compounds are used as the ingredients of the elements to be composited, the rank order of the effect of improving charge/discharge capacity is as follows (which will also be shown in Comparative Examples described later).

$Mo \gg Cr \approx Cu \approx V \approx Sn \geqq$ (Additive-free) $\geqq$ $Nb \approx Zr \approx Ti \geqq Mg$ [Order of Effect]

Although the mechanism of the effect of the compositing of Mo on the cathode material has not yet been known at the moment, there is a possibility that Mo acts as a doping reagent on the cathode material and improves the conductivities of both the reduced form $LiFePO_4$ and the oxidized form $FePO_4$. In addition to the static charge compensation effect, there is a possibility that a dynamic interaction occurs between the central metal elements $Fe^{2+}/Fe^{3+}$ of the cathode material $Li_n$-$FePO_4/FePO_4$, and the redox pair of Mo ion species, which can be in a plurality of oxidized forms. For example, there is a possibility that Mo, which can exist in many valence states, has one or more oxidation-reduction potentials (for example, an electrode potential of $Mo^{5+}/Mo^{6+}$ and/or $Mo^{4+}/Mo^{5+}$) in the vicinity of the oxidation-reduction potential of the central metal element in a cathode material for a lithium battery having 3 to 4 V of electromotive force such as $LiFePO_4$, and they act as a mediator of oxidation/reduction of Fe during charge and discharge to create a state in which conduction electrons or positive holes can be easily supplied to the cathode material.

As described before, in the evaluation made by the present inventors, the elements disclosed in Documents 3 and 4 have no effect whereas the elements other than those, such as V, Sn, Cr and Cu, have effect and, above all, Mo has an outstanding effect. It is considered that these elements can form stable redox pair ions at a potential close to the oxidation-reduction potential of $Fe^{2+}/Fe^{3+}$ in the lithium iron phosphate cathode, and this is consistent with the above estimation.

The leading hypothesis on the relation between the conductivities of olivine-type lithium iron (II) phosphate and Li-extracted oxidized form iron (III) phosphate, and the electrode oxidation-reduction and the movement behavior of $Li^+$ ions will be described. As described before, the volume ratio of the reduced form lithium iron phosphate and the Li-extracted oxidized form iron phosphate coexisting on both sides of an interface in a single crystalline changes during charge and discharge. When completely charged, the conversion to the Li-extracted oxidized form is completed. When completely discharged, the conversion to Li-inserted reduced form is completed.

Figure 2:
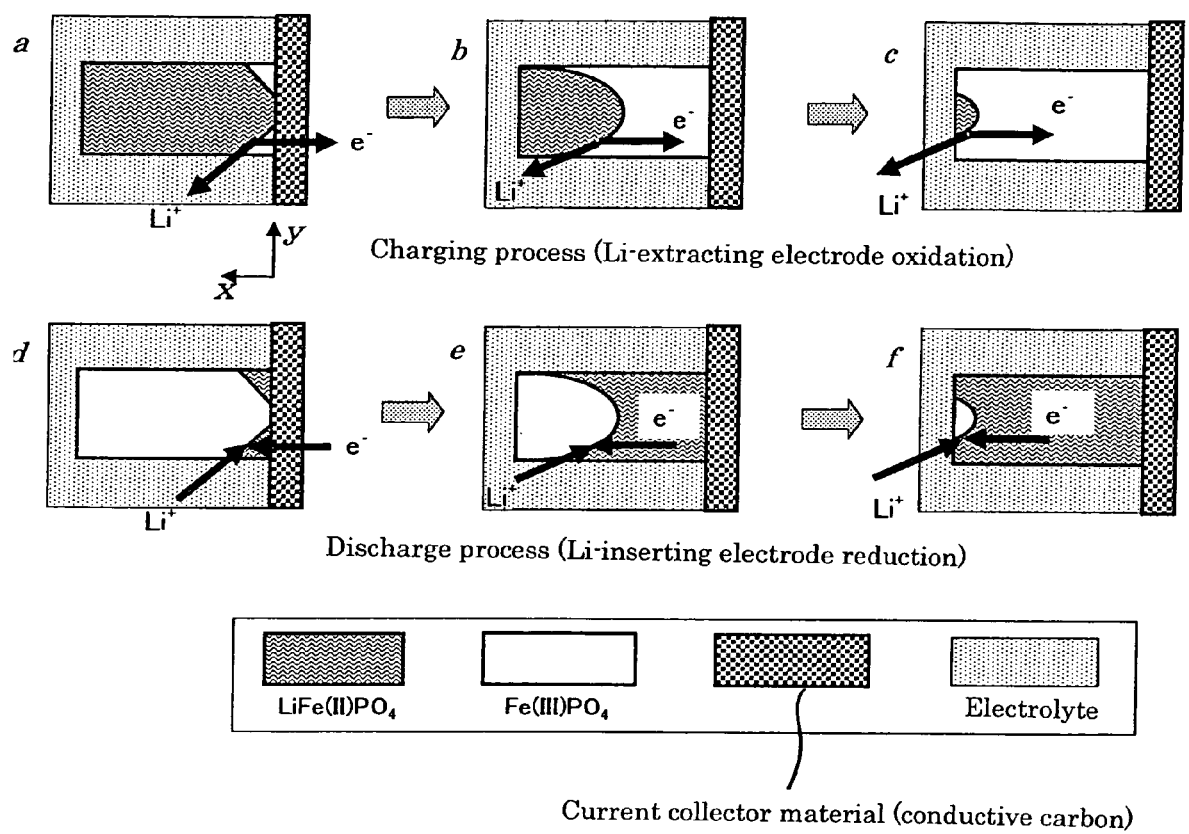
FIG. 2 is a diagram illustrating a two-dimensional hypothesis model of the vicinity of cathode material particles.

To simplify the phenomenon, a two-dimensional model of the vicinity of the cathode material particles as shown in FIG. 2 is useful. FIGS. 2a to 2c illustrate initial, intermediate and final stages of a charging process (Li-extracting electrode oxidation), respectively, and FIGS. 2d to 2f illustrate initial, intermediate and final stages of a discharging process (Li-inserting electrode reduction), respectively. An element of cathode material particles is located along the x-axis with its one side in contact with one side of a current collector material (which corresponds to a conductive auxiliary including conductive carbon deposited on the cathode material) positioned on the y-axis. The other three sides of the cathode material element are in contact with electrolyte, and an electric field is applied in the x-direction. When the cathode material has a low conductivity as in this cathode system, it is considered that, in the initial stage of charge shown in FIG. 2a, the electrode reduction begins at the corners where the three phases of the current collector material, cathode material and electrolyte meet, and the interface between the reduced form $LiFePO_4$ as a first phase into which Li has been fully inserted and the oxidized form $FePO_4$ as a second phase from which Li has been completely extracted moves in the x-direction as the charge progresses. At this time, it is difficult for the $Li^+$ ions to pass through the Li-extracted $FePO_4$ and Li-inserted $LiFePO_4$. Thus, it is most likely that the $Li^+$ ions moves along the interface between the two phases into the electrolyte as shown in the drawing (when there are Li-lost sites in the $LiFePO_4$ and Li-remaining sites in the $FePO_4$, some of the $Li^+$ ions may pass through them causing the rearrangement of the sites). On the other hand, electrons necessarily go out to the external circuit through the oxidized form $FePO_4$ and the current collector material. In steady state during charge under constant current, reduction takes place at one point on the interface to satisfy the electric neutrality. When one $Li^+$ ion moves along the interface, the velocity components in the x- and y-directions of the $Li^+$ ion are equal but opposite to the velocity components in the x- and y-directions, respectively, of an electron generated at the same time and passing through the $FePO_4$ (the velocity vectors are shown by arrows in FIG. 2). Thus, when the local moving velocity vectors of the $Li^+$ ion and electron are integrated at all the interface, the $Li^+$ ion and electron move in the opposite directions along x-axis as a whole. At this time, if the conductivity of the Li-extracted oxidized form $FePO_4$ is low, both the electrode oxidation and the movement of $Li^+$ ions are both inhibited. In particular, it is considered that since electrons in the Li-extracted oxidized form $FePO_4$ have to move long distances in the intermediate and final stages of charge shown in FIGS. 2b and 2c, large polarization occurs to increase the charge voltage. If the Li-extracted oxidized form $FePO_4$ is highly insulative, the final stage as shown in FIG. 2c cannot be reached and the charge has to be completed when the utilization rate of the active material is still very low.

During discharge, exactly the opposite process takes place as shown in FIGS. 2d to 2f. That is, the Li-inserting electrode reduction begins at the corners where the three phases of the current collector material, cathode material and electrolyte meet and the interface moves in the x-direction as the discharge progresses. Then, in the intermediate and final stages of the discharge shown in FIGS. 2e and 2f, since electrons have to move long distances in the Li-inserted reduced form $LiFePO_4$, large polarization occurs to decrease the discharge voltage. These represent the real changes in the voltage of a secondary battery using this cathode system during charge and discharge under constant current.

For the reasons as above, in this cathode system, it is considered to be significantly advantageous to increase the conductivities of both the Li-inserted reduced form $LiFePO_4$ and Li-extracted oxidized form $FePO_4$ in order to promote the electrode oxidation-reduction and the extraction/insertion of $Li^+$ ions, improve the utilization ratio (charge/discharge capacity) of the active material and reduce polarization to realize good rate characteristics.

The compositing of Mo in the present invention has a large effect on this and inhibits an increase of polarization in the intermediate and final stages of charge shown in FIGS. 2b and 2c and in the intermediate and final stages of discharge shown in FIGS. 2e and 2f. Thus, the charge/discharge voltage curve can be flat over a large charge/discharge depth range, and a high utilization rate of the active material (about 75% at 1 C rate) can be realized. The appropriate deposition of conductive carbon combined with the compositing of Mo in the present invention corresponds to contacting the other three sides of the cathode material particle element with the current collector material shown in FIG. 2. Then, it is considered that since the interface where three phases of the current collector material, cathode material and electrolyte meet is thereby increased, the effect of the compositing of Mo is synergistically enhanced. As described above, it is assumed that when compositing of Mo and deposition of conductive carbon are combined, a higher utilization rate of active material (about 88% at 1 C rate) can be realized, and the battery capacity-voltage characteristic curve shows a steep rise or fall of voltage after sufficient current corresponding to the charge/discharge capacity close to the theoretical capacity has been supplied.

The following Examples will further describe the present invention in more detail. The present invention shall not be limited by these Examples, however.

EXAMPLE 1

(1) Preparation of Cathode Material

An Mo composite $LiFePO_4$ cathode material was synthesized by the following procedure.

Figure 3:
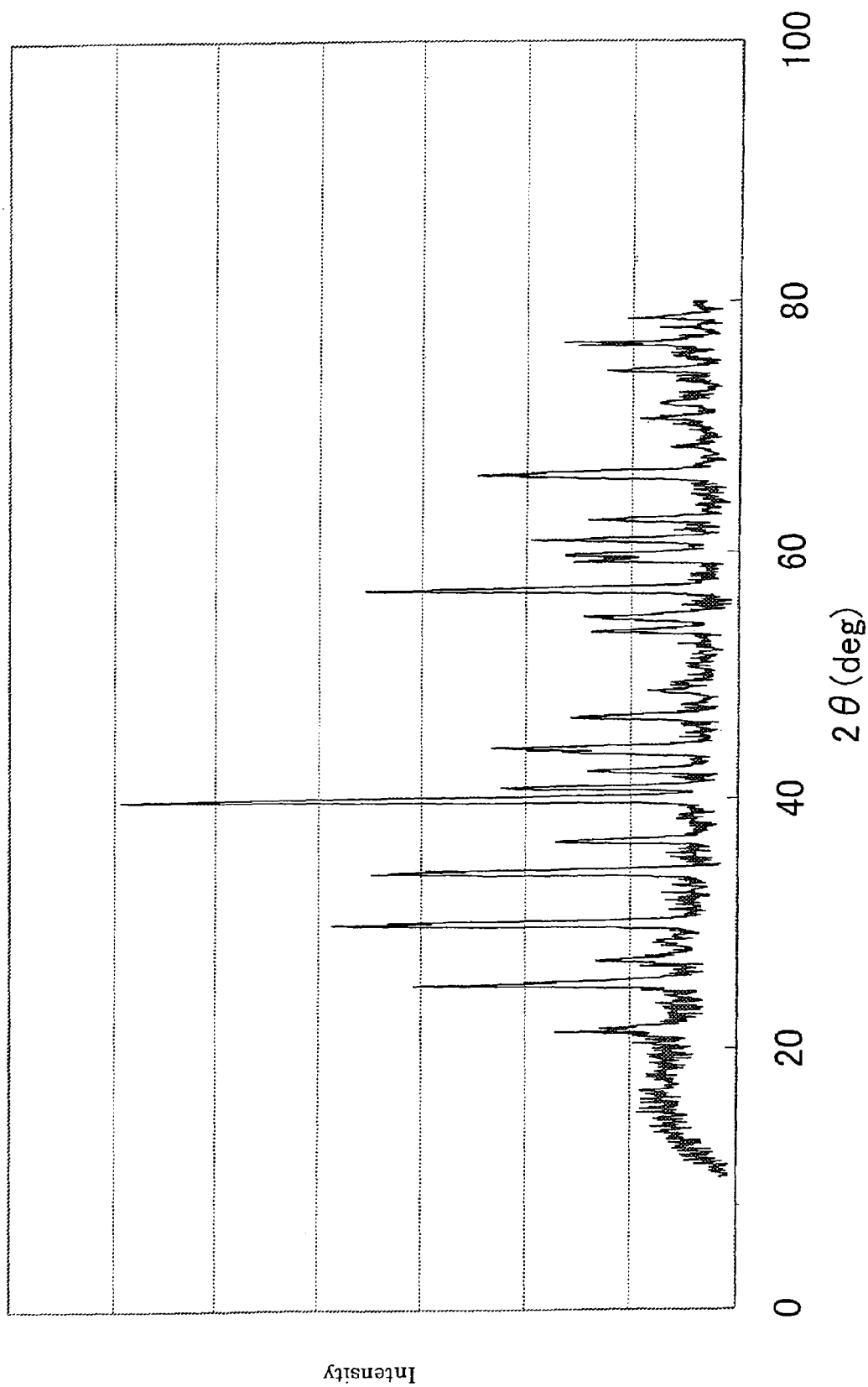
FIG. 3 is a graph showing the result of X-ray diffraction analysis of an Mo composite cathode material obtained in Example 1.

A mixture of 4.4975 g of $FeC_2O_4 \cdot 2H_2O$ (product of Wako Pure Chemical Industries, Ltd), 3.3015 g of $(NH_4)_2HPO_4$ (special grade; product of Wako Pure Chemical Industries, Ltd), and 1.0423 g of $LiOH \cdot H_2O$ (special grade; product of Wako Pure Chemical Industries, Ltd) was mixed with a volume of ethanol about 1.5 times that of the mixture. The resulting mixture was pulverized and stirred in a planetary ball mill with 2 mm zirconia beads and a zirconia pot for 1.5 hours and dried at 50° C. under reduced pressure. The dried mixture was mixed with 0.1366 g (which corresponds to 2 mol %, in terms of element ratio, based on Fe in $FeC_2O_4 \cdot 2H_2O$) of molybdenum pentachloride $MoCl_5$ (product of Wako Pure Chemical Industries, Ltd), and the resulting mixture was ground and stirred in an automatic agate mortar for 1.5 hours to obtain a calcination precursor. The calcination precursor was subjected to preliminary calcination in an alumina crucible at 400° C. for five hours while feeding pure $N_2$ gas at a flow rate of 200 ml/min. The product of the preliminary calcination was pulverized in an agate mortar for 15 minutes and subjected to final calcination at 675° C. for 24 hours in the same atmosphere (with the gas being fed from before heating and kept supplied during the calcination process until after the calcination product was cooled). According to the result of powder X-ray diffraction analysis, the thus obtained cathode material showed the same peaks as those of LiFePO$_4$ having an olivine-type crystal structure, and crystal diffraction peaks ascribable to impurities were not observed. The result of X-ray diffraction analysis is shown in FIG. 3.

Elemental analysis of the cathode material by ICP emission spectrometry indicated that it had a composition of (Li:Fe:Mo:P:O)=(0.98:1.02:0.017:1:4.73) (element molar ratio with respect to phosphorus (P); the amount of oxygen O is a calculated value). The amounts of added elements such as Mo will be hereinafter represented not by the real content but by mole percentage based on Fe (or P) for convenience sake. As described before, when the final calcination period is not sufficient in producing the Mo composite cathode material, an abnormal phenomenon in which the charge/discharge voltage shows a two-stage curve may take place and the performance is deteriorated with the progress of the charge/discharge cycle (it often, but not always, occurs when the final calcination period is about 10 hours). This phenomenon can be avoided by fully pulverizing and stirring MoCl$_5$ and taking a sufficiently long final calcination period.

(2) Fabrication of Secondary Battery

The cathode material, acetylene black [Denka Black (registered trademark), product of Denki Kagaku Kogyo K.K.; 50% pressed product] as a conductivity-imparting material and unsintered PTFE (polytetrafluoroethylene) powder as a binder were mixed at a ratio by weight of 70:25:5 and kneaded. The kneaded mixture was rolled into a sheet with a thickness of 0.6 mm, and the sheet was punched out into discs with a diameter of 1.0 cm to form a pellet as a cathode.

A metal titanium screen and a metal nickel screen were welded as cathode and anode current collectors, respectively, to a coin-type battery case made of stainless steel (Model No. CR2032) by spot welding. The cathode and an anode made of a metal lithium foil were assembled in the battery case with a porous polyethylene separating membrane (E-25, a product of Tonen Chemical Corp.) interposed between the cathode and the anode. The battery case was filled with a 1 M solution of LiPF$_6$ in a 1:1 mixed solvent of dimethyl carbonate and ethylene carbonate (product of Tomiyama Pure Chemical Industries, Ltd.) as an electrolyte solution, and then sealed to fabricate a coin-type lithium secondary battery. All the process of assembling the cathode and anode, separating membrane, and the electrolyte into a battery was performed in a dried argon-purged glove box.

Figure 4:
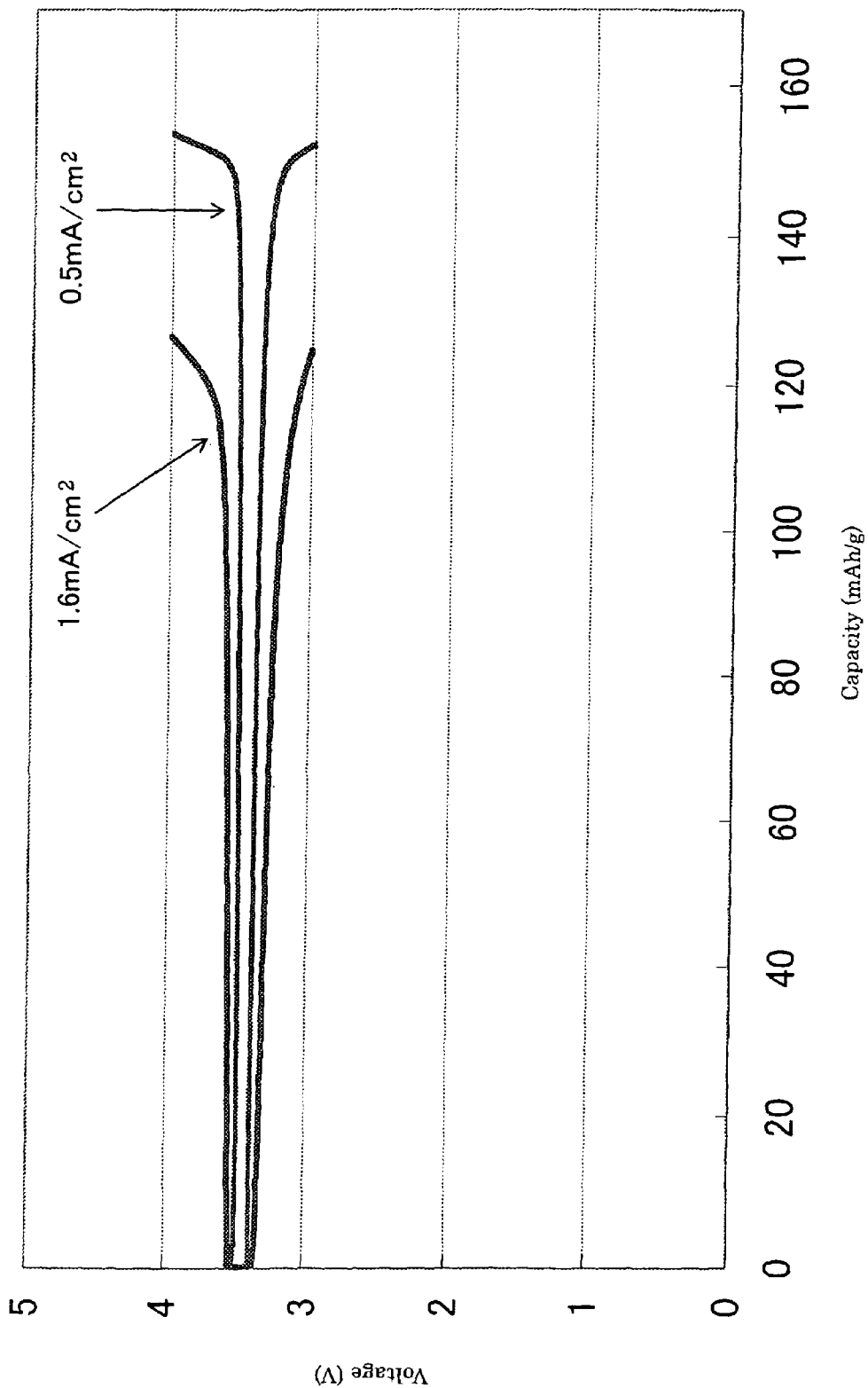
FIG. 4 is a graph showing the charge/discharge capacity and voltage characteristics of a secondary battery obtained in Example 1.
Figure 5:
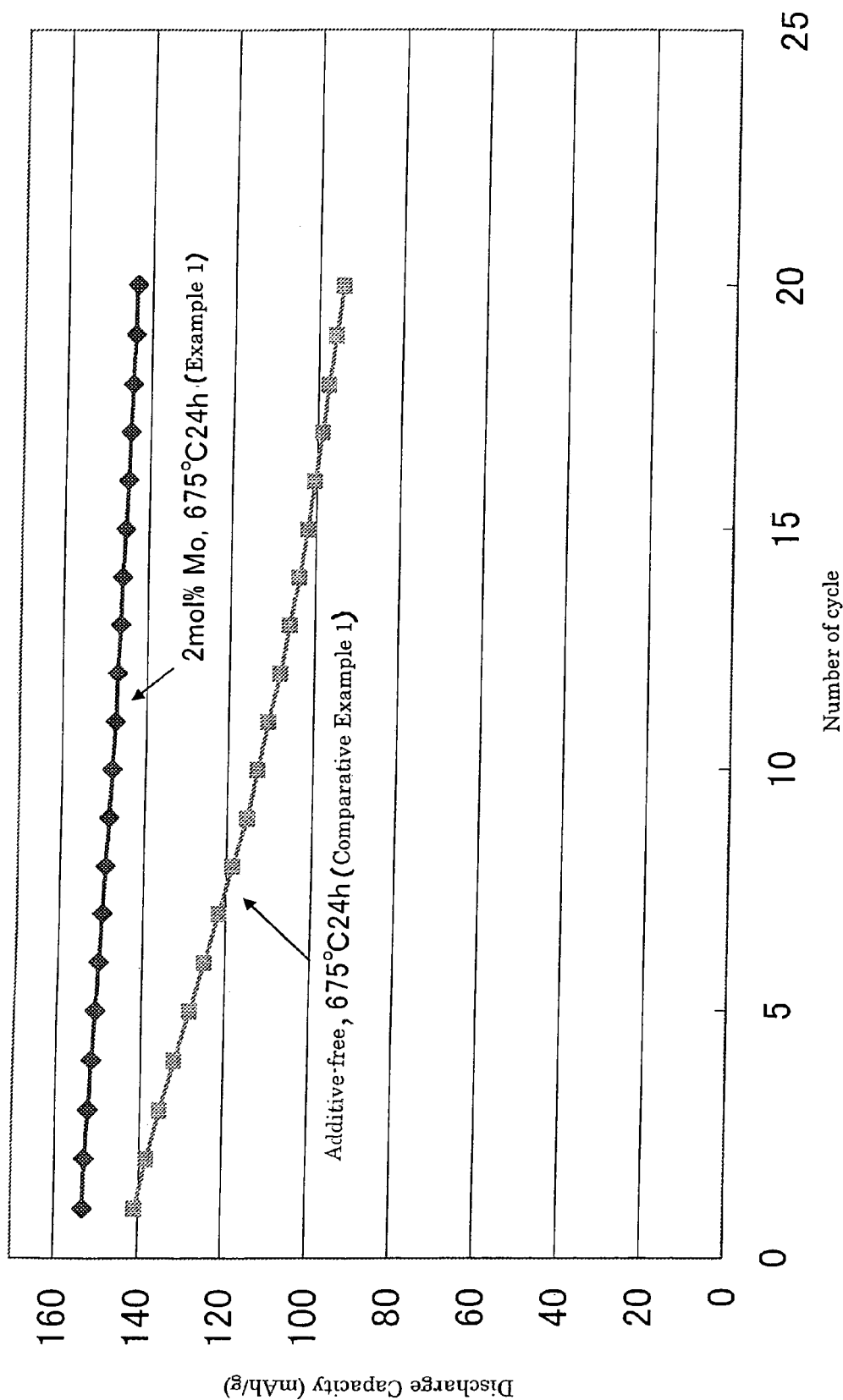
FIG. 5 is a graph showing the cycle charge/discharge characteristics of secondary batteries obtained in Example 1 and Comparative Example 1.

The secondary battery with the cathode material produced as described above was repeatedly charged and discharged under constant current at a current density of 0.5 mA/cm$^2$ per apparent area of the cathode pellet in an operating voltage range of 3.0 to 4.0 V at 25° C. The discharge capacities in the first, tenth and twentieth cycles were as shown in Table 1. The charge/discharge capacity and the voltage characteristics in the third cycle are shown in FIG. 4 (the characteristics at a current density of 1.6 mA/cm$^2$ are also shown in FIG. 4). The cycle charge/discharge characteristics of the battery are shown in FIG. 5. In the following Examples, Comparative Examples and Experimental Examples, the capacity values are standardized with the net weight of the cathode active material including the added element such as molybdenum except carbon (the weight of the conductive carbon deposits is corrected).

As shown in Table 1 and FIGS. 4 and 5, when the Mo composite lithium iron phosphate cathode material of the present invention was used, a large initial capacity for this cathode system up to 153 mAh/g was obtained at a charge/discharge current density of 0.5 mA/cm$^2$. Also, relatively stable cycle charge/discharge characteristics were achieved although a slight decrease in capacity was observed.

COMPARATIVE EXAMPLE 1

The same procedure as in Example 1 was repeated except that MoCl$_5$ was not added to the dried mixture to prepare an LiFePO$_4$ cathode material free of additives such as Mo as opposed to the 2 mol % Mo composite cathode material of Example 1. A coin-type battery was fabricated using the cathode material in the same manner as in Example 1, and the characteristics of the battery were evaluated. The discharge capacities of the battery in the first, tenth and twentieth cycles are shown in Table 1, and the cycle charge/discharge characteristics of the battery are shown in FIG. 5.

TABLE 1

| Discharge cycle | Discharge capacity of coin-type secondary battery (mAh/g) (Current density: 0.5 mA/cm$^2$ · h) | | |
|---|---|---|---|
| | 1st | 10th | 20th |
| Example 1 (2 mol % of Mo added, 675° C., 24 hours) | 153 | 148 | 144 |
| Comp. Example 1 (No Mo added, 675° C., 24 hours) | 141 | 113 | 94 |

As shown in Table 1 and FIG. 5, the coin-type battery using the Mo composite cathode material of Example 1 has a larger initial discharge capacity and exhibits less cycle deterioration than the additive-free cathode material of Comparative Example 1. This is assumed to be because the conductivities of Li-inserted reduced form LiFePO$_4$ and the Li-extracted oxidized form FePO$_4$ are both improved as the cathode material is composited with Mo.

EXAMPLE 2

The ingredients were mixed at the same ratio as in Example 1 and synthesized into a Mo composite cathode material by the same procedure as in Example 1. A cathode film coated sheet, which is more practical than a pellet type cathode as described above, was prepared using the composite cathode material by the following procedure, and the characteristics of the lithium secondary battery were evaluated.

The particle size of the 2 mol % Mo composite cathode material powder was adjusted with a 45 μm mesh sieve. The cathode material, acetylene black [Denka Black (registered trademark), product of Denki Kagaku Kogyo K.K.; 50% pressed product] as a conductivity-imparting material and a 12% polyvinylidene fluoride (PVDF)/N-methyl pyrrolidone (NMP) solution (product of Kureha Chemical Industry Co., Ltd.) were mixed at a ratio by weight of 85:5:10 (as PVDF). N-methylpyrrolidone (NMP) (water content: less than 50 ppm, product of Wako Pure Chemical Industries, Ltd.) was added to adjust the viscosity of the mixture, and the mixture was stirred in a defoaming mixer to prepare a cathode mixture coating ink. The ink was uniformly spread on an aluminum foil with a thickness of 20 μm and air-blow dried at 80° C., and the aluminum foil was roll-pressed to obtain a cathode film coated sheet with a coating thickness of 80 μm. A porous polyolefin separating membrane E-25 as described before, an excessive amount of metal Li foil anode, and the cathode film coated sheet were incorporated in a stainless disassemblable small-size battery (insulating parts are made of polyfluoroethylene). The battery case was filled with a 1 M solution of $LiPF_6$ in a 1:1 mixed solvent of dimethyl carbonate and ethylene carbonate (product of Tomiyama Pure Chemical Industries, Ltd.) as an electrolyte solution, and then sealed to fabricate a lithium secondary battery. A cycle charge/discharge test was conducted on the secondary battery to evaluate the characteristics of the secondary battery. The secondary battery was alternately charged and discharged between 4 to 3V at a prescribed current density (rate) in an operating voltage range of 3.0 to 4.0 V under constant current at 25° C. The result is summarized in Table 2.

TABLE 2

| Example 2 (2 mol % of Mo added, 675° C., 24 hours) | | Discharge capacity of secondary battery with sheet cathode (mAh/g) | | |
|---|---|---|---|---|
| Discharge cycle | | 1st | 10th | 20th |
| Current density (mA/cm²) (C rate) | 1.0 (0.5 C) | 135 | 134 | 133 |
|  | 4.0 (2.0 C) | 118 | 116 | 115 |
|  | 10.0 (5.0 C) | 87 | 85 | 83 |

As shown in FIG. 2, the secondary battery using the 2 mol % Mo composite cathode film coated sheet has a capacity comparable to that of the coin-type battery with a pellet-type cathode of Example 1 and is operable at a high current density of 1 C rate (2 mA/cm²) or higher. The cycle characteristics are slightly better than those of the battery with a pellet-type cathode. The discharge capacities at 2.0 C and 0.5 C rates in Table 2 are greater than the corresponding values in the data shown in Document 4.

The Mo composite cathode film coated sheet of Example 2 can form a practical, high-performance lithium ion secondary battery when combined with a carbon film anode of graphite, mesocarbon microbeads (MCMB) or the like.

EXAMPLE 3

The same procedure as in Example 1 was repeated except that the amount of $MoCl_5$ added was decreased to 0.0683 g, a half of that used in Example 1, and the final calcination period was shortened to 10 hours to prepare a 1 mol % Mo composite $LiFePO_4$ cathode material as opposed to the 2 mol % Mo composite cathode material of Example 1. A coin-type battery was fabricated using the cathode material in the same manner as in Example 1, and the characteristics of the battery were evaluated.

The battery was repeatedly charged and discharged in an operating voltage range of 3.0 to 4.0 V at 25° C. and a current density of 0.5 mA/cm² per apparent area of the cathode pellet. The discharge capacities of the battery in the first, tenth and twentieth cycles are shown in Table 3. In this example, a two-stage curve of the charge/discharge voltage with the progress of the cycles as described before was not observed.

In the following Comparative Examples 2 to 10, the characteristics in the case where Mo was not added and the characteristics in the case where an element other than Mo was used were evaluated to compare the effect of Mo in Example 3 with those of other elements.

COMPARATIVE EXAMPLE 2

The same procedure as in Comparative Example 1 was repeated except that the final calcination period was shortened to 10 hours to obtain a $LiFePO_4$ cathode material free of additives such as Mo. A coin-type secondary battery was fabricated using the $LiFePO_4$ cathode material in the same manner as in Example 1, and the characteristics of the battery were evaluated. The result of measurement of the discharge capacity is shown in Table 3.

COMPARATIVE EXAMPLE 3

The same procedure as in Example 3 was repeated except that 0.0146 g of magnesium hydroxide $Mg(OH)_2$ (particle size: 0.6 μm, purity: 97%; product of Wako Pure Chemical Industries, Ltd) was added instead of $MoCl_5$ to prepare a 1 mol % Mg composite $LiFePO_4$ cathode material as opposed to the 1 mol % Mo composite cathode material of Example 3. A coin-type secondary battery was fabricated using the Mg composite $LiFePO_4$ cathode material in the same manner as in Example 1, and the characteristics of the battery were evaluated. The result of measurement of the discharge capacity is shown in Table 3.

COMPARATIVE EXAMPLE 4

The same procedure as in Example 3 was repeated except that 0.0851 g of titanium butoxide monomer $Ti[O(CH_2)_3CH_3]4$ (product of Wako Pure Chemical Industries, Ltd) was added instead of $MoCl_5$ to prepare a 1 mol % Ti composite $LiFePO_4$ cathode material as opposed to the 1 mol % Mo composite cathode material of Example 3. A coin-type secondary battery was fabricated using the Ti composite $LiFePO_4$ cathode material in the same manner as in Example 1, and the characteristics of the battery were evaluated. The result of measurement of the discharge capacity is shown in Table 3.

COMPARATIVE EXAMPLE 5

The same procedure as in Example 3 was repeated except that 0.0796 g of niobium ethoxide $Nb(OC_2H_5)_5$ (product of Wako Pure Chemical Industries, Ltd) was added instead of $MoCl_5$ to prepare a 1 mol % Nb composite $LiFePO_4$ cathode material as opposed to the 1 mol % Mo composite cathode material of Example 3. A coin-type secondary battery was fabricated using the Nb composite $LiFePO_4$ cathode material in the same manner as in Example 1, and the characteristics of the battery were evaluated. The result of measurement of the discharge capacity is shown in Table 3.

COMPARATIVE EXAMPLE 6

The same procedure as in Example 3 was repeated except that 0.1128 g of 85% butanol solution of zirconium butoxide $Zr(OC_4H_9)_4$ (product of Wako Pure Chemical Industries, Ltd) was added instead of $MoCl_5$ to prepare a 1 mol % Zr composite $LiFePO_4$ cathode material as opposed to the 1 mol % Mo composite cathode material of Example 3. A coin-type secondary battery was fabricated using the Zr composite $LiFePO_4$ cathode material in the same manner as in Example 1, and the characteristics of the battery were evaluated. The result of measurement of the discharge capacity is shown in Table 3.

COMPARATIVE EXAMPLE 7

The same procedure as in Example 3 was repeated except that 0.0328 g of vanadyl oxalate n-hydrate $VOC_2H_4 \cdot nH_2O$ (added on the assumption that the hydration number is 2; product of Wako Pure Chemical Industries, Ltd) was added instead of $MoCl_5$ to prepare a 1 mol % V composite $LiFePO_4$ cathode material as opposed to the 1 mol % Mo composite cathode material of Example 3. A coin-type secondary battery was fabricated using the V composite $LiFePO_4$ cathode material in the same manner as in Example 1, and the characteristics of the battery were evaluated. The result of measurement of the discharge capacity is shown in Table 3.

COMPARATIVE EXAMPLE 8

The same procedure as in Example 3 was repeated except that 0.0499 g of copper acetate 1-hydrate $Cu(CH_3COO)_2 \cdot H_2O$ (product of Wako Pure Chemical Industries, Ltd) was added instead of $MoCl_5$ to prepare a 1 mol % Cu composite $LiFePO_4$ cathode material as opposed to the 1 mol % Mo composite cathode material of Example 3. A coin-type secondary battery was fabricated using the Cu composite $LiFePO_4$ cathode material in the same manner as in Example 1, and the characteristics of the battery were evaluated. The result of measurement of the discharge capacity is shown in Table 3.

COMPARATIVE EXAMPLE 9

The same procedure as in Example 3 was repeated except that 0.0517 g of tin oxalate $SnC_2O_4$ (product of Wako Pure Chemical Industries, Ltd) was added instead of $MoCl_5$ to prepare a 1 mol % Sn composite $LiFePO_4$ cathode material as opposed to the 1 mol % Mo composite cathode material of Example 3. A coin-type secondary battery was fabricated using the Sn composite $LiFePO_4$ cathode material in the same manner as in Example 1, and the characteristics of the battery were evaluated. The result of measurement of the discharge capacity is shown in Table 3.

COMPARATIVE EXAMPLE 10

The same procedure as in Example 3 was repeated except that 0.0278 g of chromium acetate $Cr(CH_3COO)_3$ (product of Wako Pure Chemical Industries, Ltd) was added instead of $MoCl_5$ to prepare a 1 mol % Cr composite $LiFePO_4$ cathode material as opposed to the 1 mol % Mo composite cathode material of Example 3. A coin-type secondary battery was fabricated using the Cr composite $LiFePO_4$ cathode material in the same manner as in Example 1, and the characteristics of the battery were evaluated. The result of measurement of the discharge capacity is shown in Table 3.

TABLE 3

| Discharge cycle | Discharge capacity of coin-type secondary battery (mAh/g) (Current density: 0.5 mA/cm$^2$ · h) | | |
|---|---|---|---|
| | 1st | 10th | 20th |
| Example 3 (1 mol % of Mo added, 675° C., 10 hours) | 151 | 147 | 142 |
| Comp. Example 2 (No Mo added, 675° C., 10 hours) | 142 | 114 | 94 |
| Comp. Example 3 (1 mol % of Mg added, 675° C., 10 hours) | 141 | 95 | 80 |
| Comp. Example 4 (1 mol % of Ti added, 675° C., 10 hours) | 146 | 103 | 85 |
| Comp. Example 5 (1 mol % of Nb added, 675° C., 10 hours) | 141 | 105 | 91 |
| Comp. Example 6 (1 mol % of Zr added, 675° C., 10 hours) | 143 | 106 | 88 |
| Comp. Example 7 (1 mol % of V added, 675° C., 10 hours) | 147 | 117 | 104 |
| Comp. Example 8 (1 mol % of Cu added, 675° C., 10 hours) | 150 | 123 | 106 |
| Comp. Example 9 (1 mol % of Sn added, 675° C., 10 hours) | 142 | 119 | 99 |
| Comp. Example 10 (1 mol % of Cr added, 675° C., 10 hours) | 148 | 118 | 102 |

As shown in Table 3, the battery capacity-increasing effect of Mo is outstandingly higher than those of other elements, and the elements other than Mo have no significant effect. However, Cu, Cr, V and Sn seem to have a small effect of increasing the battery capacity. On the other hand, Mg, Ti, Zr and Nb have no effect, or rather, the results of the cathode material using these elements are worse than that of the additive-free cathode material.

EXPERIMENTAL EXAMPLE 1

Study of Mo Compositing Conditions

To reveal the conditions to produce a preferable Mo composite lithium iron phosphate cathode material, the influences of the amount of Mo added and the final calcination temperature on the discharge capacity of the Mo composite cathode were examined. The discharge capacity was measured basically in the same manner as in Example 1 (current density: 0.5 mA/cm$^2$).

Figure 6:
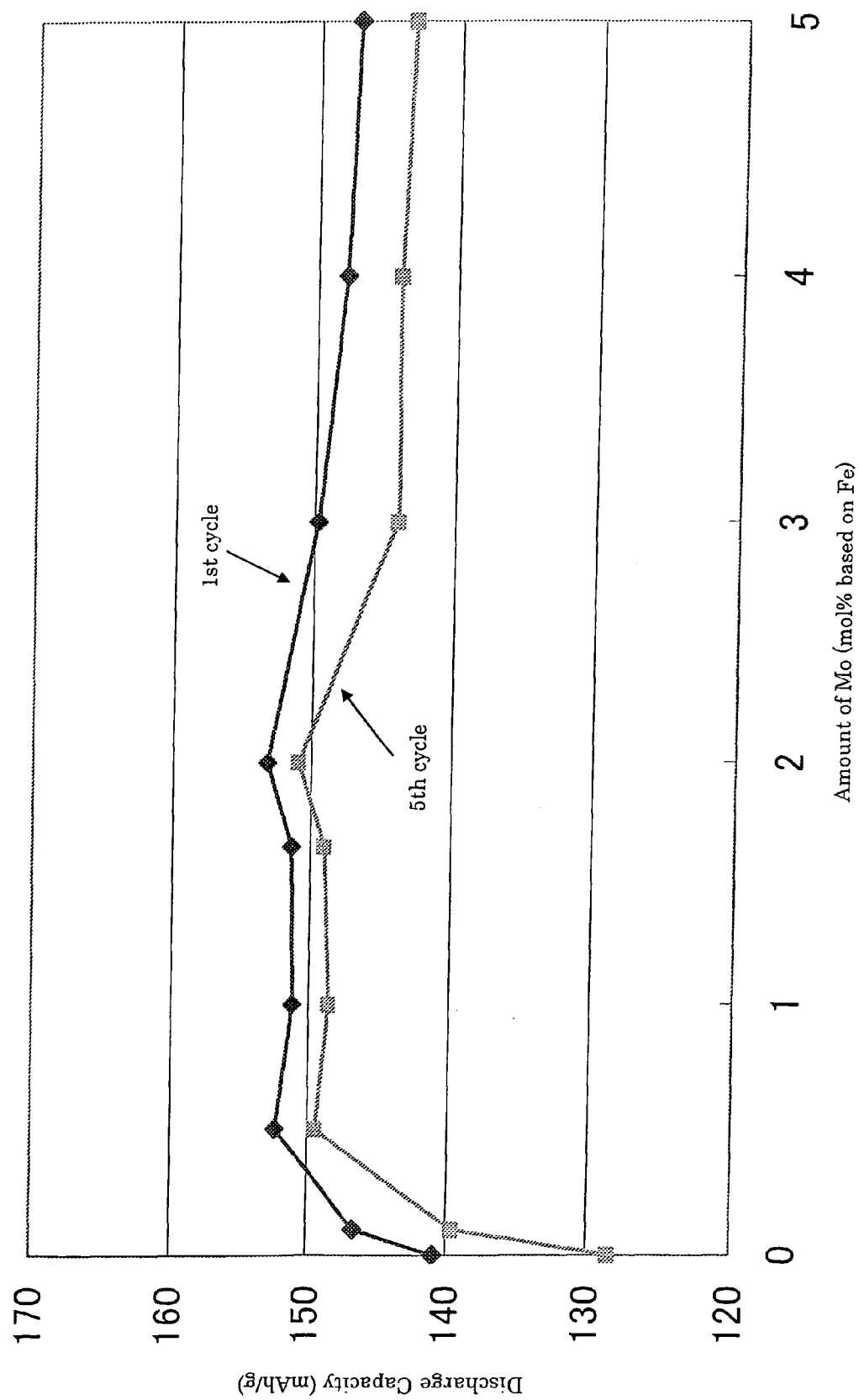
FIG. 6 is a graph showing the differences in discharge capacity of secondary batteries produced using different amounts of Mo added at a fixed calcination temperature of 675° C.

FIG. 6 is a graph showing the differences in discharge capacity of coin type secondary batteries produced using different amounts of Mo added at a fixed final calcination temperature of 675° C. As shown in FIG. 6, when only 0.1 mol % of Mo, in terms of element ratio, based on Fe is added, the battery capacity is greater than that of the battery using an additive-free cathode material. The battery capacity is maximum when about 0.5 to 3 mol % of Mo is added, and gradually decreases as the amount of Mo increases. However, even when 5 mol % of Mo is added, a large decrease in the capacity is not observed.

Figure 7:
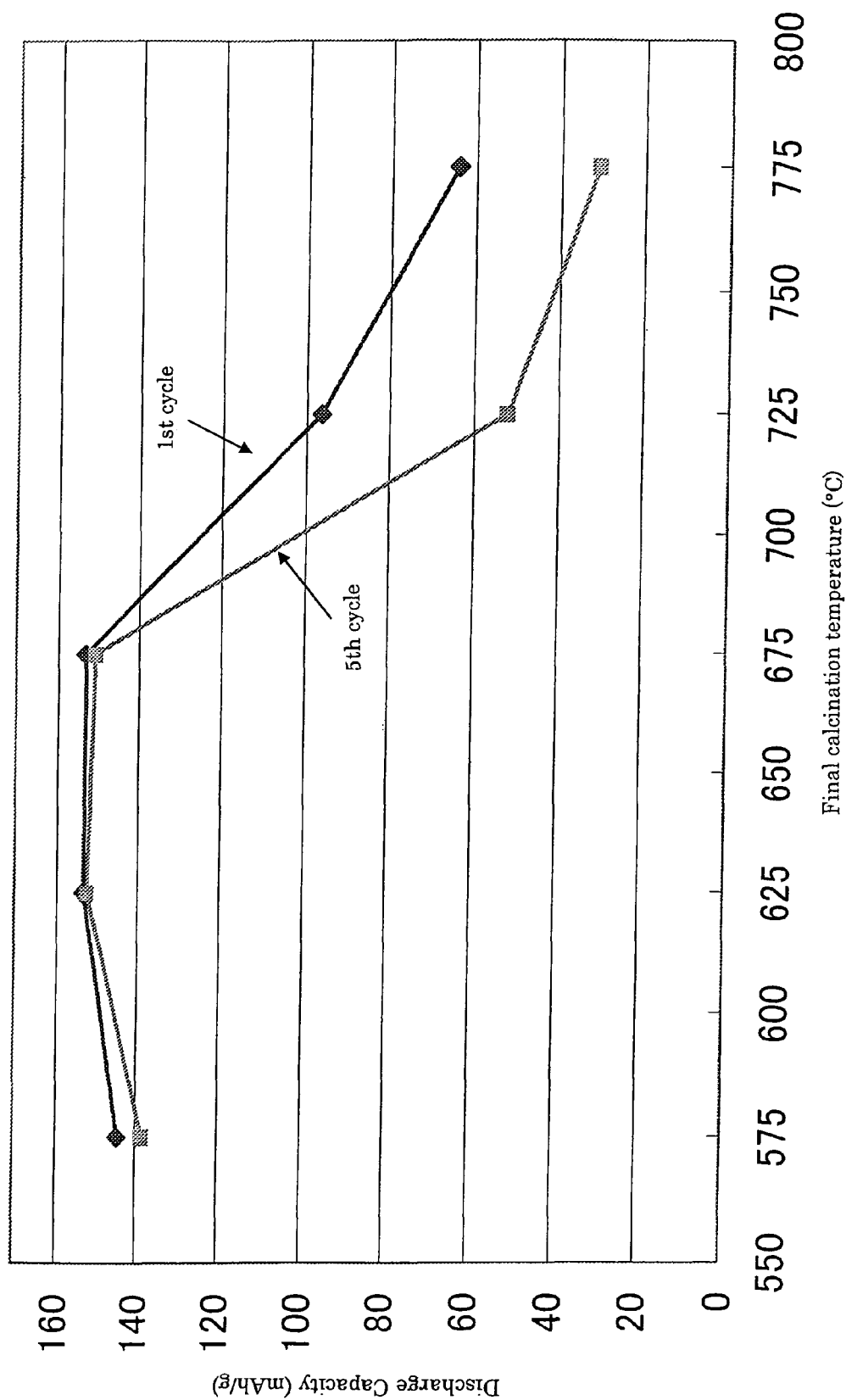
FIG. 7 is a graph showing the differences in discharge capacity of secondary batteries produced using the same amount of Mo added at different calcination temperatures.

FIG. 7 is a graph showing the differences in discharge capacity of coin type secondary batteries produced using 2 mol % of Mo added based on Fe in the ingredients at different calcination temperatures.

As shown in FIG. 7, the battery discharge capacity gradually increases from the point where the calcination temperature is about 575° C., and reaches the maximum when the calcination temperature is about 625 to 675°. When the calcination temperature is 725° C. or higher, the battery discharge capacity sharply decreases. The reason why the capacity rapidly decreases around calcination temperatures of about 700° C. is considered to be as follows: since sintering and growth of crystalline cathode material is accelerated in this temperature range and the particle size thereof is increased, the movement of Li ions in the cathode material crystal is inhibited. The preferred temperature range does not apply to Mo composite material on which conductive carbon having the effect of suppressing an increase in the particle size is deposited as described later.

EXAMPLE 4

Preparation of Conductive Carbon Deposited Mo Composite $LiFePO_4$ Cathode Material An Mo composite $LiFePO_4$ cathode material was synthesized by the following procedure.

Figure 8:
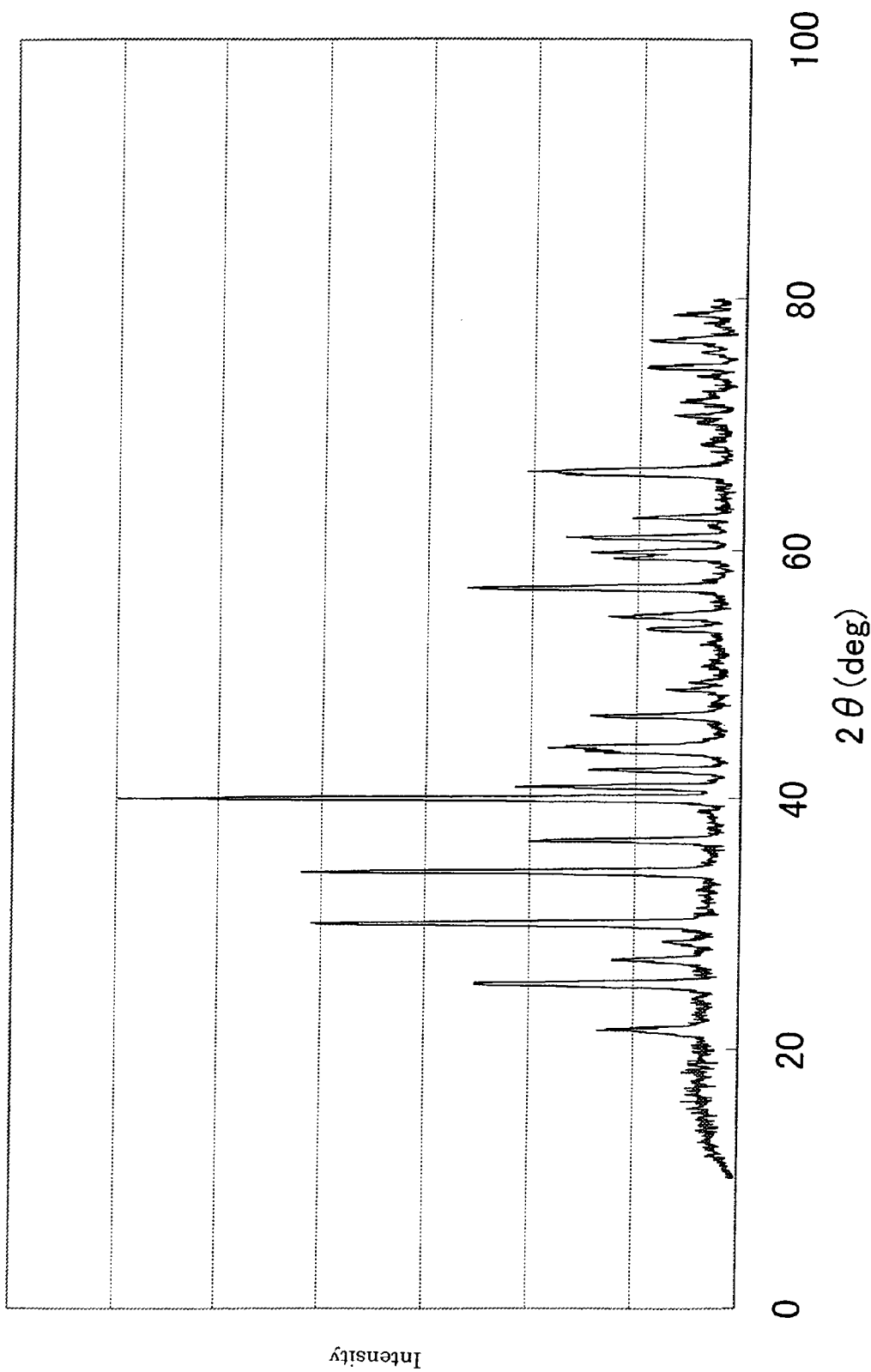
FIG. 8 is a graph showing the result of X-ray diffraction analysis of an Mo composite cathode material obtained in Example 4.

According to the same procedure and the same conditions in Example 1, a mixture of 4.4975 g of $FeC_2O_4.2H_2O$ (product of Wako Pure Chemical Industries, Ltd), 3.3015 g of $(NH_4)_2HPO_4$ (special grade; product of Wako Pure Chemical Industries, Ltd), and 1.0423 g of $LiOH.H_2O$ (special grade; product of Wako Pure Chemical Industries, Ltd) was mixed with a volume of ethanol about 1.5 times that of the mixture. The resulting mixture was pulverized and stirred in a planetary ball mill with 2 mm zirconia beads and a zirconia pot for 1.5 hours and dried at 50° C. under reduced pressure. The dried mixture was mixed with 0.0683 g (which corresponds to 1 mol % based on Fe in $FeC_2O_4.2H_2O$) of molybdenum pentachloride $MOCl_5$ (product of Wako Pure Chemical Industries, Ltd), and the resulting mixture was ground and stirred in an automatic agate mortar for 1.5 hours to obtain a calcination precursor. The calcination precursor was subjected to preliminary calcination in an alumina crucible at 400° C. for five hours while feeding pure $N_2$ gas at a flow rate of 200 ml/min. 0.0979 gram of refined coal pitch (MCP-250; product of Adchemco Corp.) with a softening point of 250° C. was added to 1.9075 g of the product of the preliminary calcination. The mixture was ground in an agate mortar for 15 minutes and subjected to final calcination at 775° C. for 10 hours in the same atmosphere (with the gas being fed from before heating and kept supplied during the calcination process until after the calcination product was cooled). According to the result of powder X-ray diffraction analysis, the thus obtained cathode material showed the same peaks as those of $LiFePO_4$ having an olivine-type crystal structure, and crystal diffraction peaks ascribable to impurities were not observed. The result of X-ray diffraction analysis is shown in FIG. 8.

Since the result of elemental analysis indicated that 3.92% by weight of carbon generated by pyrolysis of the refined coal pitch is contained but diffraction peaks corresponding to graphite crystal are not observed, it is assumed that a composite with amorphous carbon was formed. Elemental analysis of the cathode material by ICP emission spectrometry indicated that it had a composition of $(Li:Fe:Mo:P:O)=(1.03:1.08:0.0089:1:4.44)$ (element molar ratio with respect to Phosphorus (P); the amount of oxygen O is a calculated value).

(2) Fabrication of Secondary Battery

Figure 9:
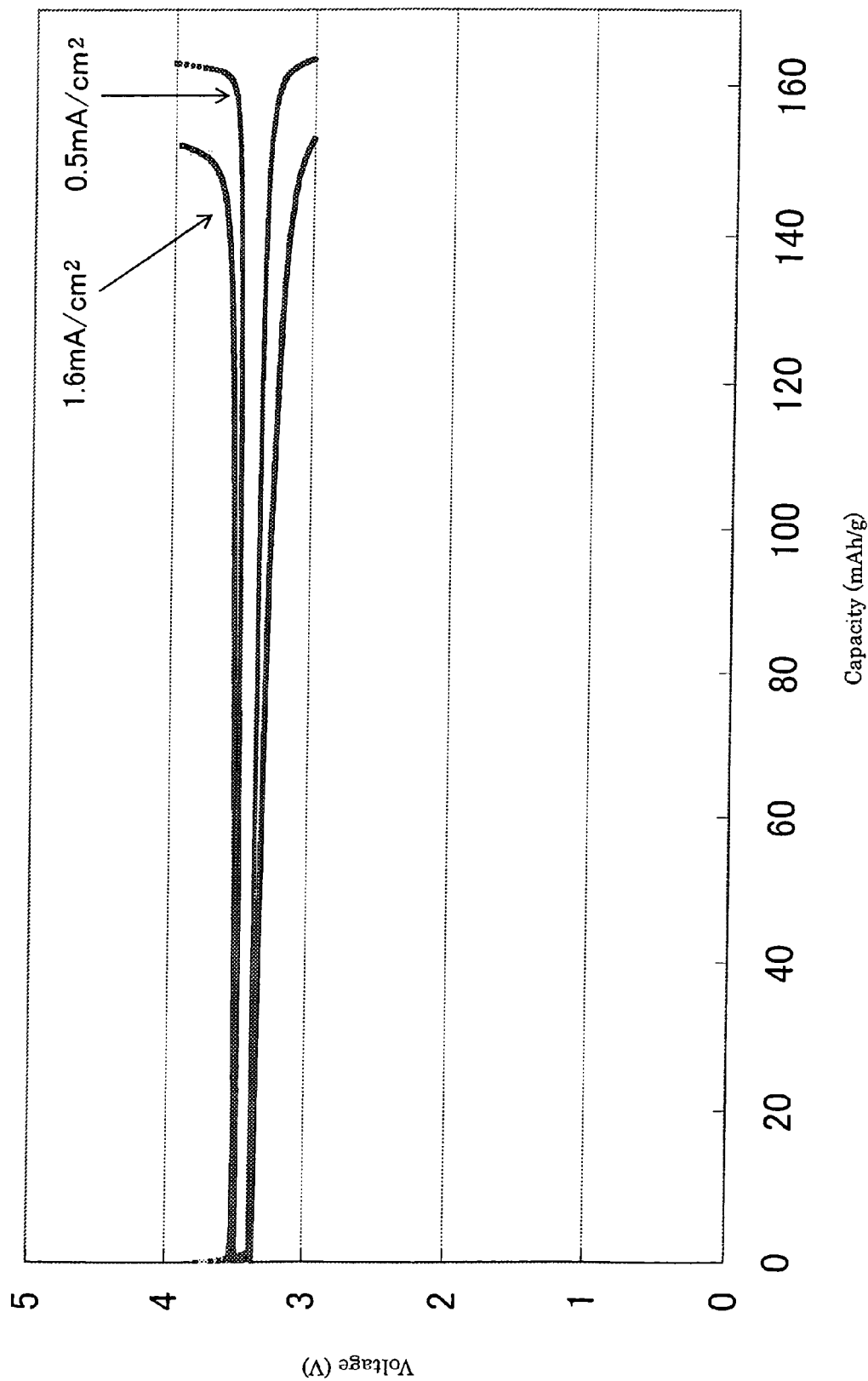
FIG. 9 is a graph showing the charge/discharge capacity and voltage characteristics of a secondary battery obtained in Example 4.

A coin-type lithium secondary battery was fabricated using the cathode material in the same manner as in Example 1. The coin-type secondary battery was repeatedly charged and discharged under constant current at a current density of 0.5 $mA/cm^2$ per apparent area of the cathode pellet in an operating voltage range of 3.0 to 4.0 V at 25° C. The discharge capacities in the first, tenth and twentieth cycles were as shown in Table 4. The charge/discharge capacity and the voltage characteristics in the third cycle are shown in FIG. 9 (the characteristics at a current density of 1.6 $mA/cm^2$ are also shown in FIG. 9). An enlarged view of the characteristic curves in the third and tenth cycles are shown in FIG. 10, and the cycle charge/discharge characteristics of the battery are shown in FIG. 11.

Figure 10:
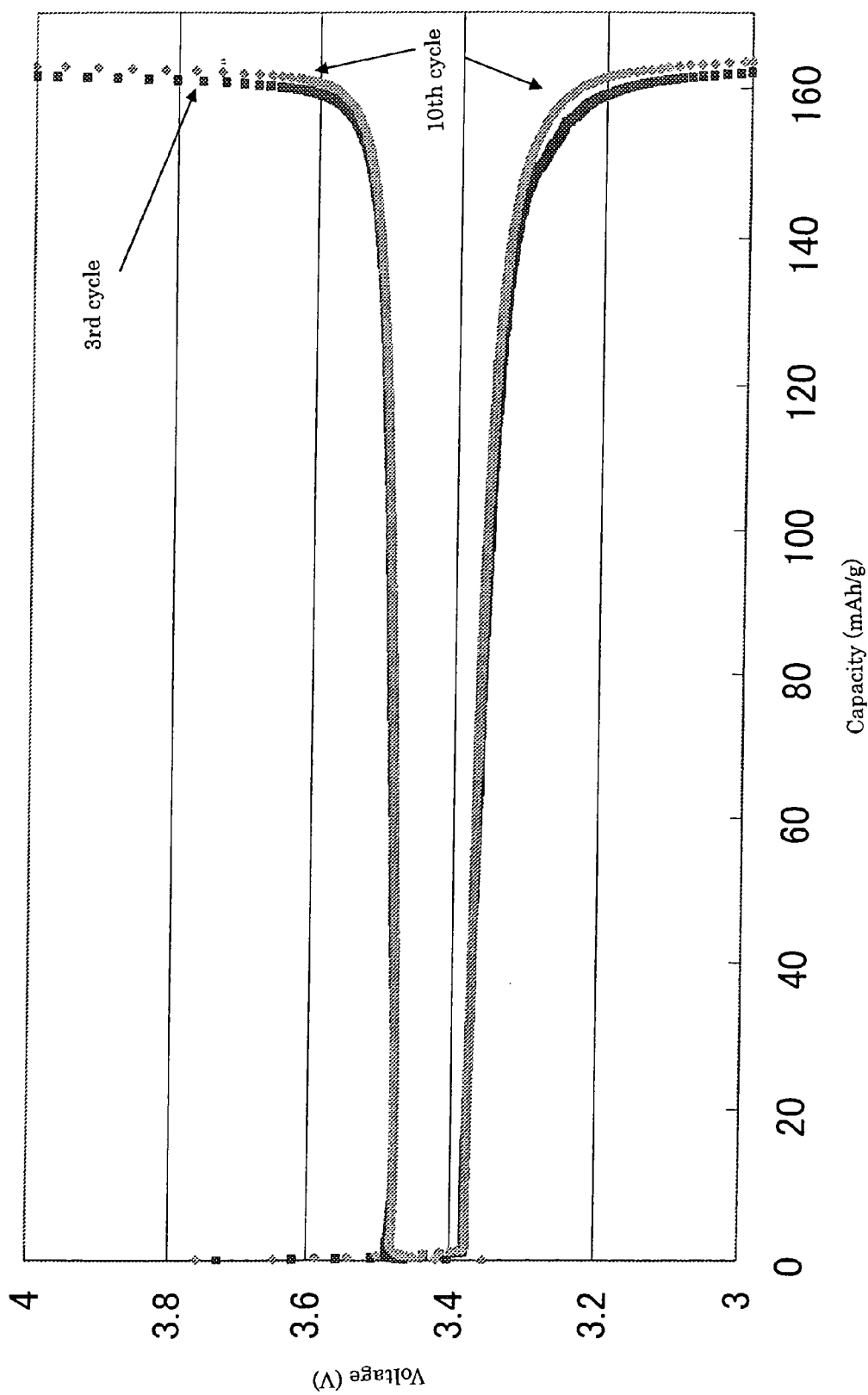
FIG. 10 is a graph showing the charge/discharge capacity and voltage characteristics in the third and tenth cycles of a secondary battery obtained in Example 4.
Figure 11:
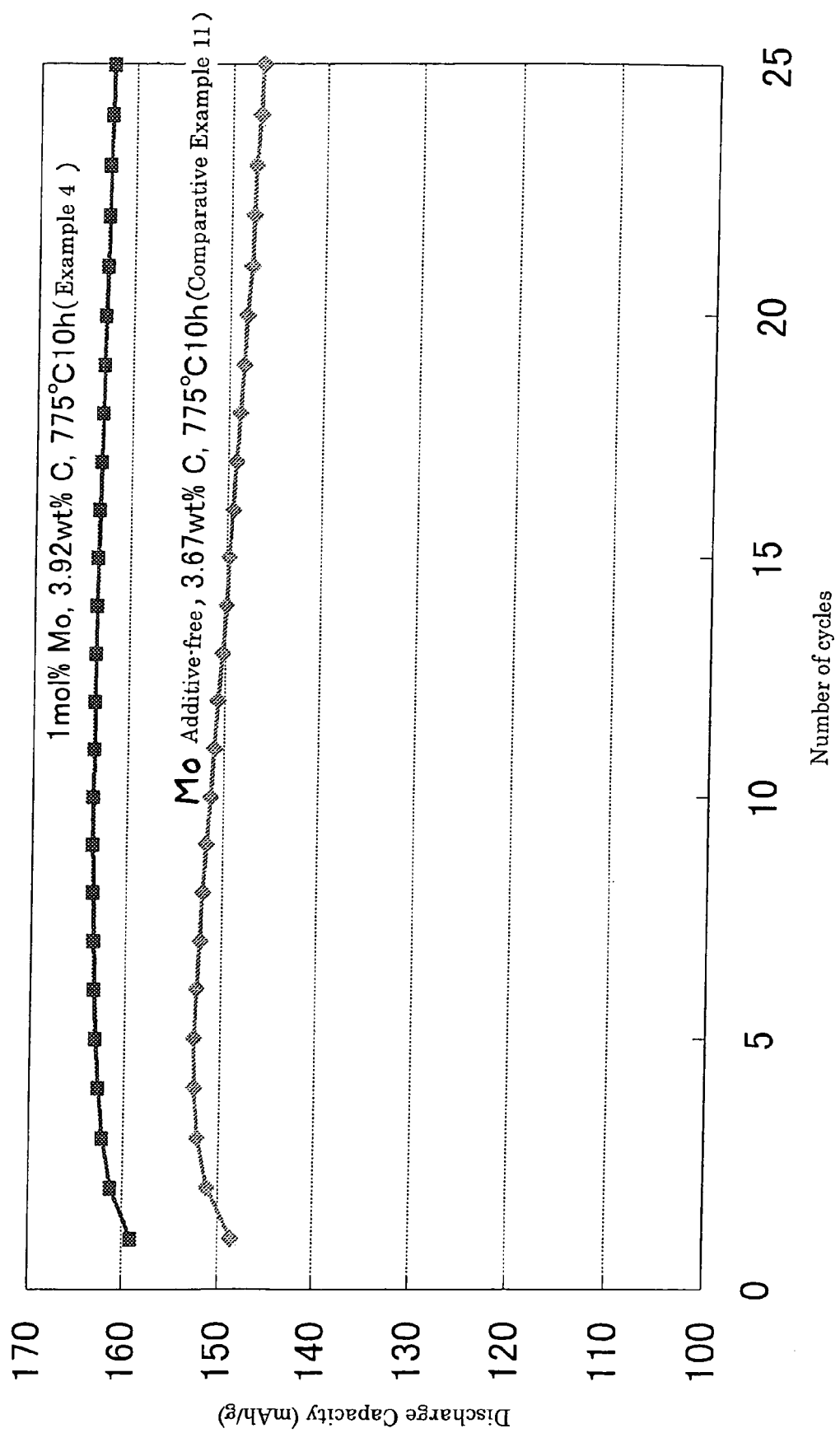
FIG. 11 is a graph showing the cycle charge/discharge characteristics of secondary batteries obtained in Example 4 and Comparative Example 11.

As shown in Table 4 and FIGS. 9 to 11, when the Mo composite lithium iron phosphate cathode material of the present invention was used, a large capacity of 164 mAh/g, which is close to the theoretical capacity (170 mAh/g) of an $LiFePO_4$ cathode system, and very stable cycle charge/discharge characteristics were achieved at a charge/discharge current density of 0.5 $mA/cm^2$. As shown in FIGS. 9 and 10, the voltage is very flat almost through the charging and discharging processes and exhibits an ideal voltage profile for a cathode of a battery in which steep rise and fall appear at the ends of the charging and discharging processes. As can be understood from FIGS. 10 and 11, the discharge capacity slightly increases from the start of the cycle charge/discharge to about the tenth cycle. This is a phenomenon peculiar to a cathode material on which conductive carbon is deposited.

COMPARATIVE EXAMPLE 11

The same procedure as in Example 4 was repeated except that $MoCl_5$ was not added to the dried mixture to obtain a conductive carbon deposited $LiFePO_4$ cathode material (free of Mo) as opposed to the 1 mol % Mo composite cathode material of Example 4. The carbon content in the cathode material was 3.67% by weight. A coin-type secondary battery was fabricated using the cathode material in the same manner as in Example 4, and the characteristics of the battery were evaluated. The discharge capacities of the secondary battery in the first, tenth and twentieth cycles are shown in Table 4, and the cycle charge/discharge characteristics of the battery are shown in FIG. 11.

As shown in Table 4 and FIG. 11, it is apparent that the coin-type battery using the conductive carbon deposited Mo composite $LiFePO_4$ cathode material of Example 4 has obviously a much larger initial discharge capacity and better cycle charge/discharge characteristics as compared with the battery using the conductive carbon deposited cathode material (free of Mo) of Comparative Example 11, which can be regarded as having very high performance from a general view point. This is assumed to be because the interface of the cathode active material, electrolyte and current collector material where the cathode oxidation-reduction begins is dramatically increased by the deposition of conductive carbon and the utilization ratio of the active material is improved, and because the charge/discharge characteristics are improved by the improvement of the conductivity of the Mo composite $LiFePO_4$ cathode material itself.

TABLE 4

|  | Discharge capacity of coin-type secondary battery (mAh/g) (current density: 0.5 $mA/cm^2 \cdot h$) | | |
| --- | --- | --- | --- |
| Discharge cycle | 1st | 10th | 20th |
| Example 4 (3.92% by weight of conductive carbon, and 1 mol % of Mo added, 775° C., 10 hours) | 159 | 164 | 163 |
| Comp. Example 11 (3.67% by weight of conductive carbon, but No Mo added, 775° C., 10 hours) | 149 | 152 | 149 |

EXAMPLE 5

The ingredients were mixed at the same ratio as in Example 4 and synthesized into a conductive carbon deposited Mo composite $LiFePO_4$ cathode material by the same procedure as in Example 4. A cathode film coated sheet, which is more practical than a pellet type cathode, was prepared using the composite cathode material by the same procedure as in Example 2, and the characteristics of the lithium secondary battery were evaluated. The result is summarized in Table 5.

As shown in Table 5, the secondary battery using a 2 mol % Mo composite film sheet as the cathode has a capacity comparable to that of the coin-type secondary battery with a pellet-type cathode of Example 1, is operable at a high current density of 1 C rate (2 $mA/cm^2$) or higher without causing any problem, and has good cycle characteristics. The discharge capacities at all the rates in Table 5 are greater than the corresponding values in the data shown in Document 4.

The cathode using the Mo composite film sheet of Example 5 can form a practical, high-performance lithium ion secondary battery when combined with a carbonaceous film anode of graphite, mesocarbon microbeads (MCMB) or the like. The battery is applicable to power systems including electric vehicles and hybrid electric vehicles as well as portable devices such as cellular phones since it has a large capacity and good rate characteristics.

TABLE 5

| Example 5 (3.92% by weight of conductive carbon, and 1 mol % of Mo added, 775° C., 10 hours) | Discharge capacity of secondary battery with sheet cathode (mAh/g) | | |
| --- | --- | --- | --- |
| Discharge cycle | 1st | 10th | 20th |
| Current density (mAh/cm²) (C rate) 1.0 (0.5 C) | 150 | 154 | 154 |
| 4.0 (2.0 C) | 136 | 140 | 139 |
| 10.0 (5.0 C) | 116 | 120 | 119 |

EXPERIMENTAL EXAMPLE 2

Study of Carbon Depositing Conditions and Mo Compositing Conditions

To reveal the conditions to produce a preferable conductive carbon deposited Mo composite $LiFePO_4$ cathode material, the influences of the final calcination temperature on the discharge capacity of the composite cathode will be described. The measurement was made basically under the same conditions as in Example 1.

Figure 12:
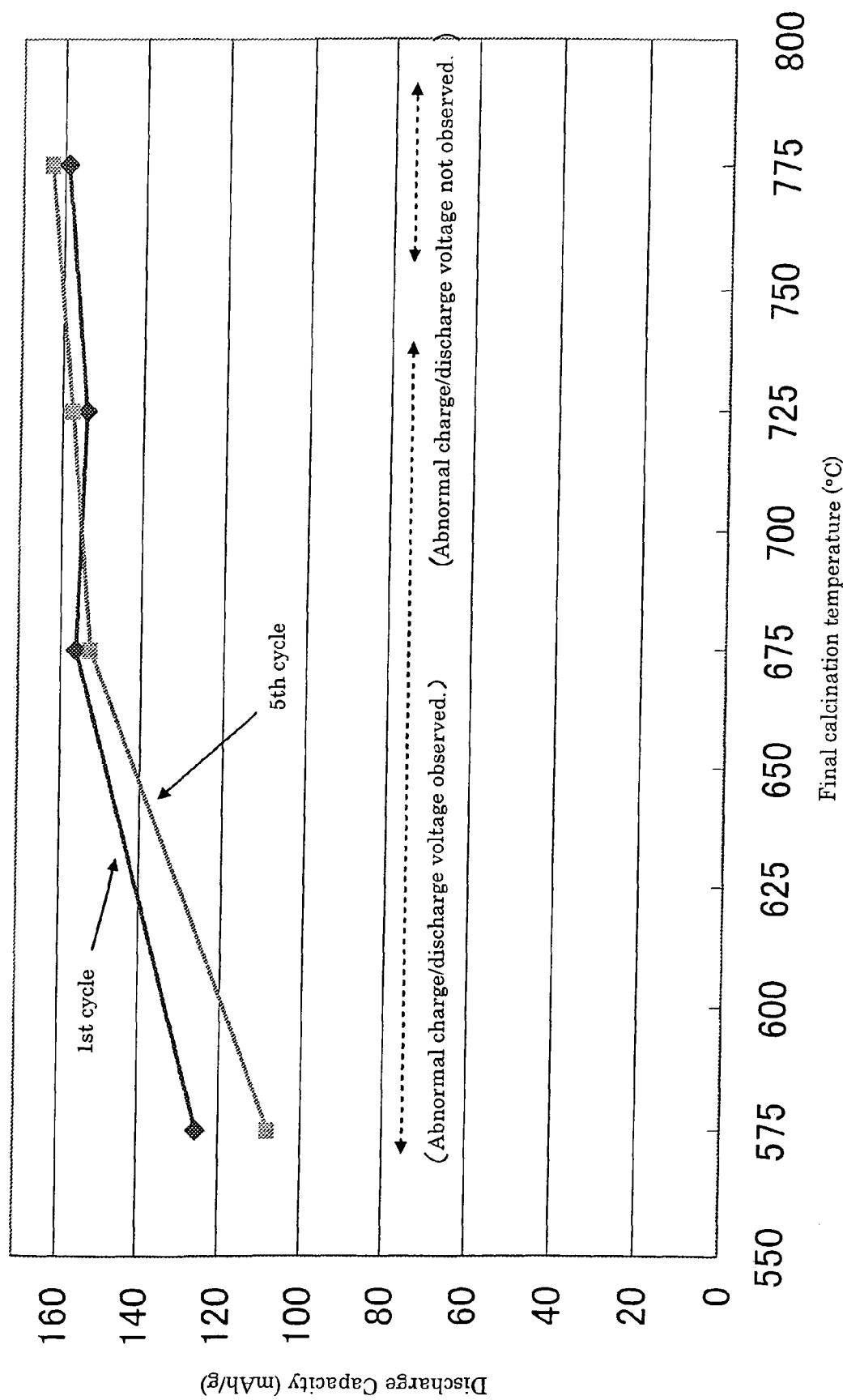
FIG. 12 is a graph showing the differences in discharge capacity of secondary batteries produced with a fixed amount of Mo added and a fixed amount of conductive carbon deposits at different calcination temperatures.

FIG. 12 shows the differences in discharge capacity of coin-type batteries (current density: 0.5 $mA/cm^2$) in the case where the amounts of Mo added and conductive carbon deposits were fixed to 1 mol % based on Fe in the ingredients and about 4% by weight, respectively, but the calcination temperature was varied.

As shown in FIG. 12, the battery discharge capacity gradually increases from the point where the calcination temperature is about 575° C., and keeps increasing even when the calcination temperature is higher than about 625 to 675°. When the calcination temperature is 775° C., a cathode material with very high performance can be obtained. This is greatly different from the case where conductive carbon is not deposited and indicates that when conductive carbon is deposited on the surface of the cathode active material, sintering and growth of crystal is inhibited even if calcination is carried out at a temperature higher than 700° C. and the state where $Li^+$ ions can be easily moved in the active material particles can be maintained.

Figure 13:
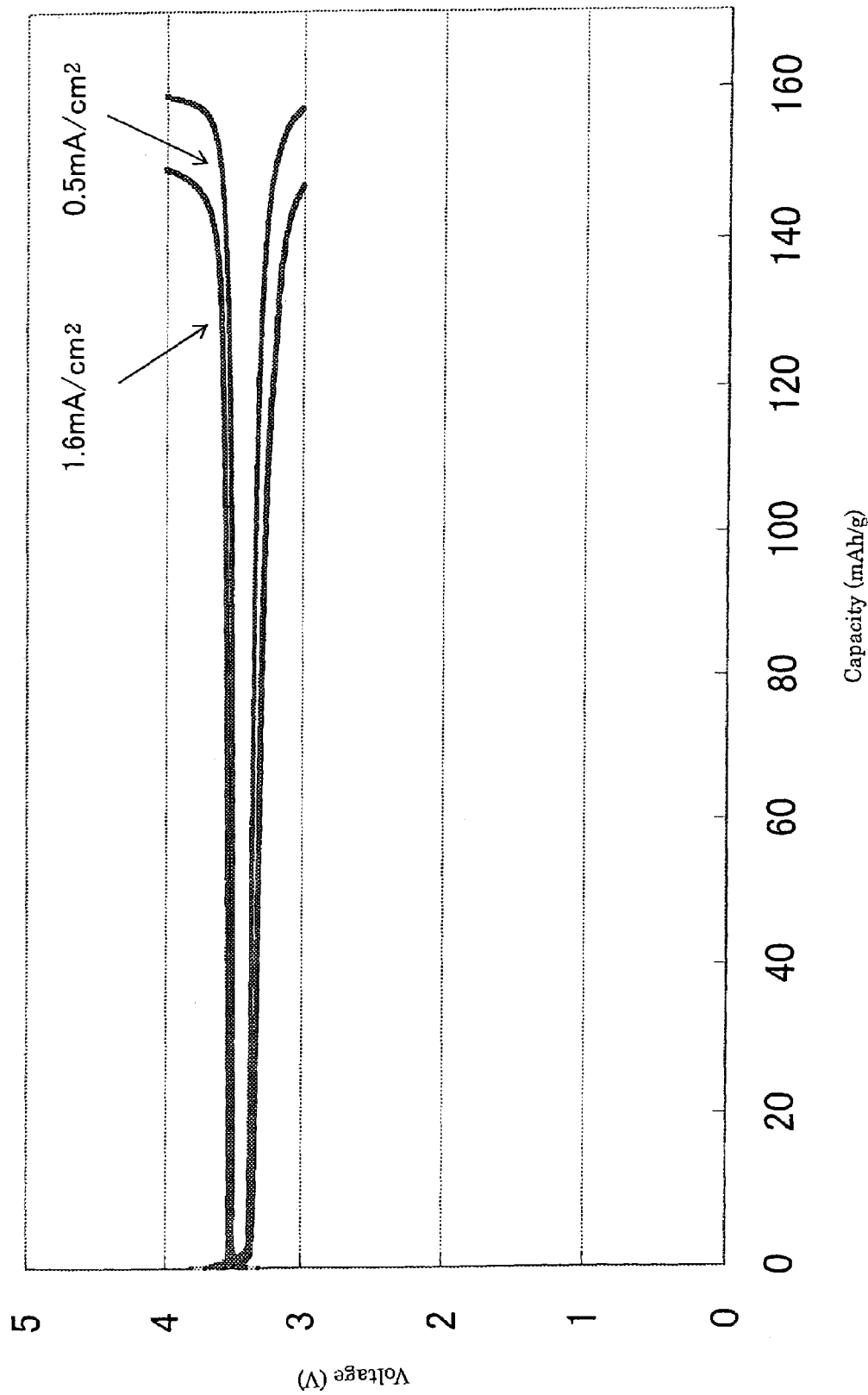
FIG. 13 is a graph showing the charge/discharge capacity and voltage characteristics in the third cycle of a secondary battery produced at a final calcination temperature of 725° C.
Figure 14:
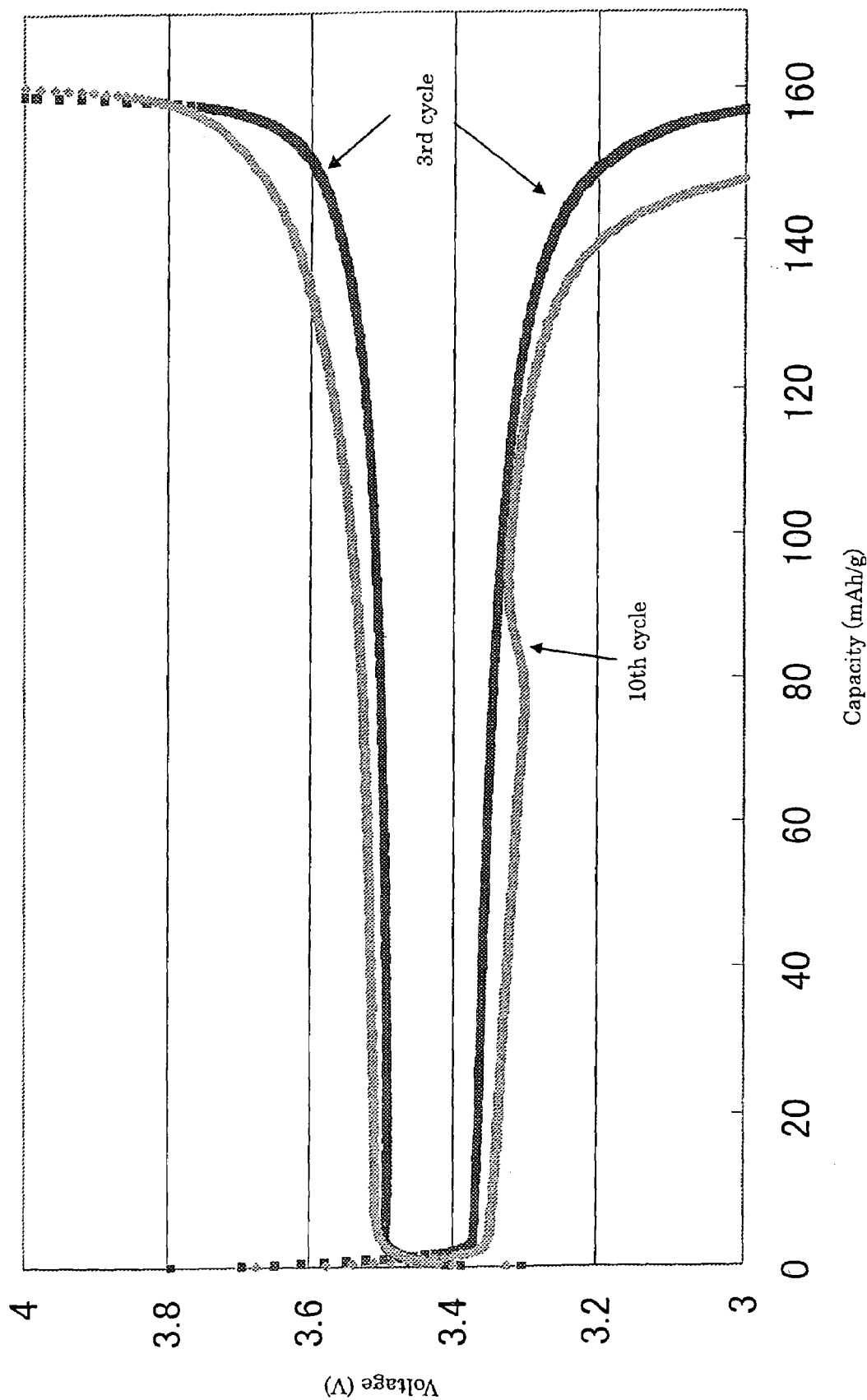
FIG. 14 is a graph showing the charge/discharge capacity and voltage characteristics in the third and tenth cycles of a secondary battery produced at a final calcination temperature of 725° C.

As described before, when the final calcination is carried out at a temperature not higher than 750° C. in producing a conductive carbon deposited Mo composite cathode material, charge/discharge voltage characteristics tend to exhibit an abnormal behavior with the progress of the charge/discharge cycles (Especially, the behavior frequently appears during discharge. The phenomenon is often observed when conductive carbon is not deposited as described before.). As a typical example, the charge/discharge characteristics of a cathode material subjected to final calcination at 725° C. for 10 hours are shown in FIGS. 13 and 14. FIGS. 13 and 14 show the data in the case where the amount of Mo added is 1 mol % based on Fe in the ingredients and the amount of conductive carbon deposits is 3.87% by weight.

The charge/discharge curves in the third cycle of the cathode material calcined at 725° C. shown in FIG. 13 show good cathode characteristics similar to those of the cathode material calcined at 775° C. shown in FIG. 9 except that the capacity is slightly smaller, the polarization during charge/discharge is slightly larger and the charge/discharge coulomb efficiency is slightly worse. In the tenth cycle (current density: 0.5 $mA/cm^2$), however, the polarization during charge/discharge is apparently large and an abnormal voltage step is observed on the discharge side as shown in FIG. 14. In the cycles after that, the conditions gradually get worse and the performance is deteriorated in many cases. The cause of the abnormal behavior is not yet known but it is considered to be because phase separation and precipitate of the Mo chemical species take place by the charge and discharge and inhibit the movement of $Li^+$ ions. It is understood that the problem can be avoided when the final calcination is carried out at a temperature not lower than 750° C. such as 775° C., because the structure of Mo is uniformed by annealing at the time of the high-temperature calcination. The final calcination is preferably carried out at a temperature in the range about 775 to 800° C. since when the final calcination is carried out at a temperature not lower than about 850° C., the active material $LiFePO_4$ is pyrolyzed to cause a change in composition and sintering takes place unavoidably.

EXAMPLE 6

For the purpose of determining the existing state of Mo in the Mo composite lithium iron phosphate $LiFePO_4$ cathode material, cathode materials were produced using a fixed amount of molybdenum pentachloride $MOCl_5$ with different amounts of an ingredient containing lithium ions $Li^+$, iron ions $Fe^{2+}$ or phosphate ions $PO_4^{3-}$, and an experiment was conducted to evaluate the influence on the crystal structure and the charging/discharging behaviors of the battery. In this experiment, a relatively large amount (5 mol % based on Li, Fe or P) of Mo was added without taking the optimization of the cathode material performance into account so that the change in the structure and the influence on the charging/discharging behavior could be apparent. No conductive carbon precursor was added.

The ingredients were introduced such that the molar ratio of the components was Li:Fe:P:Mo=1:1:1:0.05 as a basic composition of Li, Fe, phosphate ions and Mo, and a cathode material was produced (which will be hereinafter referred to as "sample A").

A mixture of 3.5979 g of $FeC_2O_4.2H_2O$ (product of Wako Pure Chemical Industries, Ltd), 2.3006 g of $NH_4H_2PO_4$ (special grade; product of Wako Pure Chemical Industries, Ltd), and 0.8393 g of LiOH.H$_2$O (special grade; product of Wako Pure Chemical Industries, Ltd) was mixed with a volume of isopropanol about 1.5 times that of the mixture. The resulting mixture was pulverized and stirred in a planetary ball mill with 2 mm zirconia beads and a zirconia pot for 1.5 hours and dried at 50° C. under reduced pressure. The dried mixture was mixed with 0.2732 g (which corresponds to 5 mol %, in terms of element ratio, based on P in NH$_4$H$_2$PO$_4$) of molybdenum pentachloride (product of Wako Pure Chemical Industries, Ltd), and the resulting mixture was ground and stirred in an automatic agate mortar for 1.5 hours to obtain a calcination precursor. The calcination precursor was subjected to preliminary calcination in an alumina crucible at 400° C. for 5 hours while feeding pure N$_2$ gas at a flow rate of 200 ml/min. The product of the preliminary calcination was pulverized in an agate mortar for 15 minutes and subjected to final calcination at 675° C. for 10 hours in the same atmosphere (with the gas being fed from before heating and kept supplied during the calcination process until after the calcination product was cooled).

Figure 15:
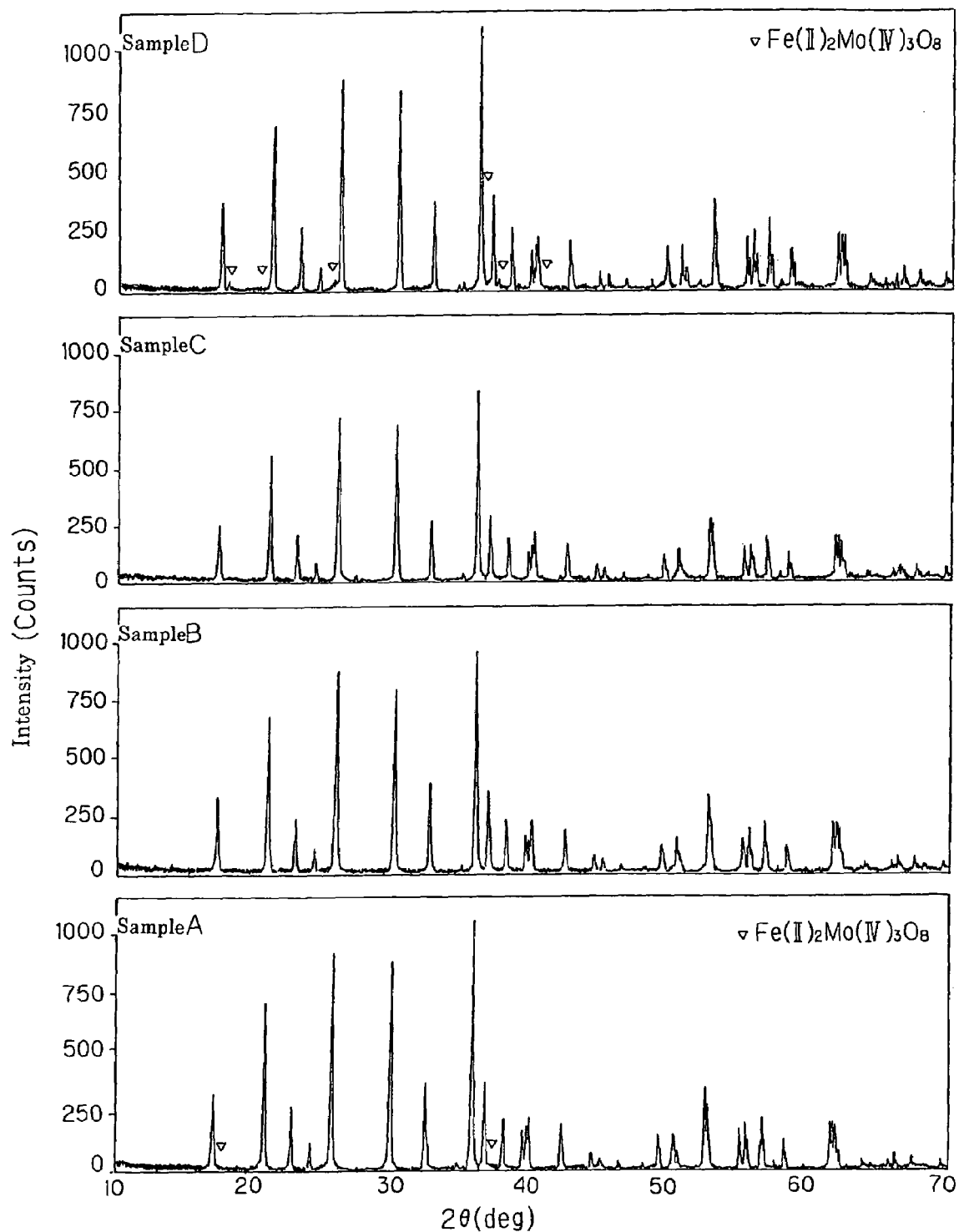
FIG. 15 is a graph showing the results of powder X-ray diffraction analysis of samples A to D obtained in Example 6.

Elemental analysis of the sample A by ICP emission spectrometry indicated that it had a composition of (Li:Fe:Mo:P:O)=(1.01:1.01:0.045:1:3.94) (element molar ratio with respect to P, the amount of oxygen O is a calculated value). According to the result of powder X-ray diffraction analysis, most part of the sample A showed the same peaks as those of LiFePO$_4$ having an olivine-type crystal structure. Although no other diffraction peaks ascribable to impurities were obviously observed, only the existence of a small amount of Fe(II)$_2$Mo(IV)$_3$O$_8$ (kamiokite) was suggested [in this experiment, the measurement was made using a device with a higher sensitivity (automatic X-ray diffraction system RINT2000/PC, a product of Regaku Corporation) than the one used in Examples 1 and 4]. The result of powder X-ray diffraction analysis is shown in FIG. 15.

The ingredients were prepared such that the molar ratio of the components was as follows as a basic composition of Li, Fe, phosphate ions and Mo, and cathode materials B, C and D were produced. That is, the samples B, C and D were produced by the same procedure as in the preparation of the sample A except that the amount of LiOH.H$_2$O (sample B), FeC$_2$O$_4$.2H$_2$O (sample C) or NH$_4$H$_2$PO$_4$ (sample D) was respectively 0.95 times as much as the corresponding one in sample A.

Sample B Li:Fe:P:Mo=0.95:1:1:0.05
Sample C Li:Fe:P:Mo=1:0.95:1:0.05
Sample D Li:Fe:P:Mo=1:1:0.95:0.05

Elemental analysis of the samples by ICP emission spectrometry indicated that the samples B, C and D had compositions (Li:Fe:Mo:P:O)=(0.95:1.01:0.044:1:3.96), (Li:Fe:Mo:P:O)=(0.99:0.95:0.046:1:3.95), and (Li:Fe:Mo:P:O)=(1.05:1.05:0.048:1:3.96), respectively (element molar ratio with respect to Phosphorus (P); the amount of oxygen O is a calculated value).

The results of powder X-ray diffraction analysis of the samples are also shown in FIG. 15. The samples B and C showed the same peaks as those of LiFePO$_4$ having an olivine-type crystal structure, and no other diffraction peaks ascribable to impurities were observed. The sample D showed the same peaks as those of LiFePO$_4$ having an olivine-type crystal structure and clear peaks corresponding to Fe(II)$_2$Mo(IV)$_3$O$_8$ (kamiokaite), which was suggested to exist in the sample A. This indicated that kamiokaite was apparently phase-separated as impurities.

Coin-type lithium secondary batteries with a metal lithium anode were fabricated using the samples in the same manner as in Example 1, and a cycle charge/discharge test was conducted on the batteries under conditions of a temperature of 25° C. and a charge/discharge current density of 0.5 mA/cm$^2$. The discharge capacities of the batteries in the second, tenth and twentieth cycles are shown in Table 6. The internal resistances of the coin-type lithium secondary batteries charged to at a practical capacity of 50% obtained from the difference in voltage during charge and discharge are also shown in Table 6.

TABLE 6

| Cathode material (molar feed ratio/ Li:Fe:Mo:P:O) | 2nd cycle | | 10th cycle | | 20th cycle | |
|---|---|---|---|---|---|---|
| | Discharge capacity (mAh/g) | Internal resistance ($\Omega$cm$^2$) | Discharge capacity (mAh/g) | Internal resistance ($\Omega$cm$^2$) | Discharge capacity (mAh/g) | Internal resistance ($\Omega$cm$^2$) |
| Sample A (1:1:0.05:1) | 151 | 157 | 130 | 208 | 116 | 232 |
| Sample B (0.95:1:0.05:1) | 112 | 144 | 117 | 119 | 118 | 114 |
| Sample C (1:0.95:0.05:1) | 103 | 111 | 85 | 118 | 78 | 120 |
| Sample D (1:1:0.05:0.95) | 111 | 163 | 70 | 175 | 57 | 183 |

Judging from Table 6, the state of Mo in the olivine-type lithium iron phosphate cathode material samples A to D composited with 5 mol % of Mo and the influences of the Mo on the cathode function are as described in the following (i) to (iii).

(i) Sample B

It is assumed that when the amount in moles of Li is reduced by the same amount in moles of Mo added as in the sample B, the cathode material has a single-phase olivine-type LiFePO$_4$ structure after the calcination, and the added Mo has entered the octagonal sites usually occupied by Li instead thereof in the olivine-type crystal structure (the occupied sites cannot be precisely determined, however). A secondary battery produced using the Mo composite cathode in this state and a metal Li anode (the anode capacity is excessive with respect to the cathode capacity) exhibited an intermediate level of internal resistance among the four samples in the initial stage of charge/discharge (second cycle) and had a low discharge capacity because the amount of Li was reduced.

However, the capacity increased with the progress of the cycles (became larger than that of the sample A in the twentieth cycle), and, eventually, exhibited good cycle characteristics with a small decrease in capacity.

Also, unlike the samples A, C and D, the internal resistance of the battery largely decreased with the progress of the cycles (became lower than that of the sample C in the twentieth cycle).

It is considered that the change in the charge/discharge characteristics took place because some rearrangement of Li ions, Fe ions and Mo ions (such as migration of some of the ions between their sites) occurred in the crystalline phase of the cathode active material of the sample B during charge/discharge to change the physical properties until the conductivity and the movement of Li ions were enhanced to reduce the cathode polarization, as Li is supplied from the anode. The sample B can be suitably used as a cathode material since it is excellent in cycle characteristics although no conductive carbon is deposited.

(ii) Sample C

It is assumed that when the amount in moles of Fe is reduced by the same amount in moles of Mo added as in the sample C, the cathode material has a single-phase olivine-type LiFePO$_4$ structure after the calcination, and the added Mo has entered the octagonal sites usually occupied by Fe instead thereof in the olivine-type crystal structure (the occupied sites cannot be precisely determined, however). A secondary battery produced using the Mo composite cathode in this state and an anode with an excessive amount of metal Li exhibited the lowest internal resistance in the four samples in the initial stage of charge/discharge (second cycle), which indicated that the cathode polarization was small. However, the discharge capacity was small because the amount of Fe as the oxidation-reduction center was reduced.

The capacity of the battery using the sample C gradually decreased as the cycle charge/discharge was repeated, and the stability of the capacity with the progress of the cycles was apparently worse than that of the battery using the sample B. Also, the internal resistance of the battery slightly increased with the progress of the cycles. It is considered that the decease in capacity with the progress of the cycles is due to a general cause of deterioration which is often observed in this kind of cathode system, that is, it is due to an increase in the contact resistance between the cathode active material particles caused by the repetition of expansion and contraction of the cathode crystal lattice. The sample C is advantageous in that the internal resistance of the battery can be small from the early stage of charge/discharge, and its cycle characteristics can be improved by depositing conductive carbon on it. Thus, it can be used as a cathode material.

(iii) Samples A and D

It is considered that the sample A prepared with Mo added and without reducing the amounts of Li and Fe does not have a single-phase olivine-type structure in a precise sense but contains a small amount of Fe(II)$_2$Mo(IV)$_3$O$_8$ (Kamiokite). It is considered that, as the composition of Kamiokite indicates, the added Mo has mainly been substituted with Fe, and a complex oxide formed from the excess Mo, which was not able to be substituted with Fe, and extracted Fe was liberated and precipitated. Thus, it is considered that when Mo is added without reducing the amount of Li or Fe, the Mo tends to enter the octagonal sites usually occupied by Fe (the occupied sites cannot be precisely determined, however).

A secondary battery produced using the Mo composite cathode in this state and an anode with an excessive amount of metal Li exhibited an internal resistance slightly greater than that of the battery using the sample B in the early stage of charge/discharge (second cycle). It should be noted that it exhibited an initial capacity close to the theoretical capacity 170 mAh/g (about 150 mAh/g, which was also observed in Experimental Example 1), which was greater than those of the batteries using the samples B, C and D although as large an amount of Mo as 5 mol % was added. This indicates that most of the constitutional elements Li, Fe and P of lithium iron phosphate can still function as cathode active materials even when 5 mol % of Mo is added.

As the cycle charge/discharge was repeated, the capacity of the battery using the sample A gradually decreased and the internal resistance of the battery gradually increased as in the case with the battery using the sample C. When Mo is added without reducing the amounts of Li and Fe as in the sample A, abnormal discharge and an abnormal increase in the internal resistance (cathode polarization component of it) sometimes take place as described in Example 1. That tendency is also observed with the sample A.

It is considered that the decrease in discharge capacity with the progress of the cycles is due to an increase in contact resistance at interfaces of the cathode material particles and an abnormal increase in polarization. Since Mo was added without adjusting the amounts of Li and Fe at the time of the calcination of the cathode material, there is possibly a relation between the fact that the composition of the sample A exceeded the stability limit of the single olivine-type crystal phase (and thus Kamiokite was separated) and the occurrence of the abnormal discharge and increase in cathode polarization.

However, the sample A is advantageous in its large initial capacity, and its cycle characteristics can be improved by depositing conductive carbon on it. Thus, it can be used as a cathode material.

In the sample D produced with Mo added and a reduced amount of the phosphate ingredient (P), a noticeable amount of Kamiokite was phase-separated and precipitated. A metal lithium secondary battery using the sample D had a small initial capacity since the amount of the cathode active material was decreased, and its stability of the capacity was remarkably reduced with the progress of the cycles. It is considered that another cause of the deterioration of cycle characteristics of the samples D and A is seemed that Kamiokite deposited on the surface of the cathode active material adversely affecting the activity of the cathode active material.

Thus, when Mo is added, it is preferred to use a slightly larger amount of the phosphate ingredient than that used in the sample A (in other words, use slightly smaller amounts of the lithium ingredient and/or the iron ingredient than that of the phosphate ingredient) in producing an Mo composite cathode in order to prevent the generation of byproducts such as Kamiokite.

As described above, the cathode material having an olivine-type crystal structure, containing lithium ions (Li$^+$), iron (II) ions (Fe$^{2+}$) and phosphate ions (PO$_4^{3-}$) as primary components, and 0.1 to 5 mol %, preferably 0.5 to 5 mol %, of Mo based on P has a large capacity and provides excellent cathode performance. Further, when the amounts of Li and/or Fe in the Mo-containing cathode material are reduced to the extent that no byproducts such as Fe(H)$_2$Mo(IV)$_3$O$_8$ (Kamiokite) can be generated, a higher cathode performance can be expected.

In the case where the amounts of Li and/or Fe are reduced, a cathode material with improved cycle characteristics can be obtained when the amount of Li is reduced relatively more than that of Fe, and a cathode material having small cathode polarization from the early stage of charge/discharge cycle can be obtained when the amount of Fe is reduced relatively more than that of Li. Here, it is preferred that the total amount in moles of Li and/or Fe to be reduced does not exceed the amount in moles of Mo to be added.

As described above, the cathode characteristics can be controlled by adjusting the amounts of Li, Fe and phosphate ingredients to be introduced and adding Mo.

It is reported in Document 3 that a lithium iron phosphate cathode composited with Mg, Cl, Al, Ni or the like which is prepared using the metal added based on P (phosphate ions) and Fe in an amount less than the stoichiometric amount has improved cycle characteristics. However, as far as compositing of Mo, the mechanism for compositing and its effect are more complicated as shown in Example 6.

In Document 4, 1 mol % of Nb, Ti, Zr, Al or Mg based on P (phosphate ions) and Fe in an amount 1 mol % less than the stoichiometric amount were added to prepare lithium iron phosphates doped with the elements (molar ratio of the component elements being Li:Fe:P:doped metal=1:0.99:1:0.01). It is reported that according to the result of X-ray diffraction analysis of the substances, the peaks corresponding to impurity crystals of lithium phosphate LiPO$_4$ were observed in addition to the peaks corresponding to the primary component having an olivine-type structure whereas the metal element doped lithium iron phosphates prepared using a reduced amount of Li without reducing the amount of Fe (molar ratio of the constituent elements being Li:Fe:P:doped metal 0.99: 1:1:0.01) showed no peaks corresponding to impurities. In the document, this is one of the grounds that the added element has substituted not for Fe but for Li. The samples B and C of the example prepared with 5 mol % of Mo added and the same amount of Fe or Li reduced are different from the case of Document 4 in that they did not show the peaks corresponding to impurity crystals but had a single-phase olivine type structure as shown in FIG. 15.

While the present invention has been described in terms of the preferred embodiments, it is to be understood that the present invention is not limited to the above embodiments but applicable to other embodiments within the scope of the invention described in the scope of patent claims.

For example, in addition to the reduced form Mo composite lithium iron phosphate LiFePO$_4$ cathode material and the reduced form Mo composite cathode material on which conductive carbon is deposited, oxidized form iron phosphate [FePO$_4$] generated from the reduced form by a battery charge reaction or a chemical oxidation is also included in the scope of the present invention as identical Mo composite cathode material and carbon deposited Mo composite cathode material.

As has been described in detail in the foregoing, the cathode material containing Li$_n$FePO$_4$ as a primary component of the cathode active material and Mo is a cathode material having good charge/discharge characteristics which have not been previously achieved. The cathode material can be easily prepared by compositing a cathode active material with Mo. Further, a cathode material obtained by depositing conductive carbon on the above cathode material exhibits better charge/discharge characteristics.

INDUSTRIAL APPLICABILITY

The cathode material produced by the method of the present invention can be used as a cathode material for a secondary battery such as a metal lithium battery, lithium ion battery and lithium polymer battery. Further, the secondary battery using the cathode material is expected to be used as a high current power source for driving a movable body such as a hybrid electric vehicle and for a cellular phone.

The invention claimed is:

1. A cathode material for a secondary battery containing a cathode active material represented by the general formula Li$_n$FePO$_4$ (wherein 0<n≦1) as a primary component and molybdenum (Mo), wherein
the content of molybdenum (Mo) is in the range of 0.1 to 5 mol %, in terms of elemental ratio, based on iron (Fe) in the cathode active material; and
the primary component is combined with molybdenum (Mo) by the steps of mixing the primary component and a compound containing molybdenum (Mo), to obtain a calcination precursor, and then calcining the calcination precursor to obtain the desired cathode active material.

2. A cathode material for a secondary battery containing a cathode active material having an olivine crystal structure, and including molybdenum (Mo), wherein the cathode active material consists of lithium ions (Li$^+$), bivalent iron ions (Fe$^{2+}$) and phosphate ions (PO$_4^{3-}$);
the content of molybdenum (Mo) is in the range of 0.1 to 5 mol % based on the content of P in the cathode active material; and
the cathode active material is prepared by the steps of mixing Li$_n$FePO$_4$ (wherein 0<n≦1) and a compound containing molybdenum (Mo), to obtain a calcination precursor and then calcining the calcination precursor to obtain the desired cathode active material.

3. The cathode material for a secondary battery according to claim 2, wherein the content of lithium or iron, or the total content of lithium and iron, is smaller than that of a lithium iron phosphate having a 1:1:1 stoichiometric ratio of lithium, iron and phosphorus by, at most, an amount in moles corresponding to the content of molybdenum (Mo).

4. The cathode material for a secondary battery according to any one of claims 1, 2 or 3, further comprising conductive carbon deposited on the surface thereof.

5. A secondary battery containing the cathode material according to claim 4 as a constituent element.

6. A secondary battery containing the cathode material according to any one of claim 1, 2, or 3 as a constituent element.

7. A method for producing a cathode material for a secondary battery containing a cathode active material represented by the general formula Li$_n$FePO$_4$ (wherein 0<n≦1) as a primary component and molybdenum (Mo), comprising the steps of:
mixing the primary component with a compound containing molybdenum (Mo), to obtain a calcination precursor, and
calcining the calcination precursor,
wherein the compound containing molybdenum (Mo) is added in an amount such that the content of molybdenum (Mo) is 0.1 to 5 mol % based on the content of P in the cathode active material.

8. The method for producing a cathode material for a secondary battery according to claim 7, wherein the ingredients of the cathode active material are introduced
such that the amount of lithium in an ingredient for introducing lithium, the amount of iron in an ingredient for introducing iron, or the total amount of lithium and iron, is smaller than that of a lithium iron phosphate having a 1:1:1 stoichiometric ratio of lithium, iron and phosphorus by, at most, an amount in moles corresponding to the content of molybdenum (Mo).

9. The method for producing a cathode material for a secondary battery according to any one of claims 7 or 8, wherein the calcination step has a first stage in a temperature range that rises from room temperature to a temperature between 300° C. and 450° C., and a second stage in a temperature range from room temperature to the calcination completion temperature, and wherein the second stage of the calcination step is carried out after addition of (i) a substance from which conductive carbon is formed by pyrolysis to (ii) the product of the first stage of the calcination step.

10. The method for producing a cathode material for a secondary battery according to claim 9, wherein the substance from which conductive carbon is fowled by pyrolysis is bitumen or a saccharide.

* * * * *